(12) United States Patent
Ito

(10) Patent No.: US 11,476,483 B2
(45) Date of Patent: Oct. 18, 2022

(54) FUEL CELL SYSTEM

(71) Applicant: TOYOTA JIDOSHA KABUSHIKI KAISHA, Toyota (JP)

(72) Inventor: Masayuki Ito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/465,330

(22) Filed: Sep. 2, 2021

(65) Prior Publication Data

US 2022/0209266 A1 Jun. 30, 2022

(30) Foreign Application Priority Data

Dec. 25, 2020 (JP) .............................. JP2020-217154

(51) Int. Cl.
*H01M 8/04858* (2016.01)
*H01M 8/04119* (2016.01)

(52) U.S. Cl.
CPC ..... *H01M 8/04865* (2013.01); *H01M 8/0494* (2013.01); *H01M 8/04119* (2013.01); *H01M 2250/20* (2013.01)

(58) Field of Classification Search
CPC ........... H01M 8/0494; H01M 8/04753; H01M 8/04559
See application file for complete search history.

(56) References Cited

U.S. PATENT DOCUMENTS

| | | | | |
|---|---|---|---|---|
| 2016/0141905 A1* | 5/2016 | Yamanaka | ......... | H01M 8/0488 320/135 |
| 2020/0112039 A1* | 4/2020 | Ito | ..................... | H01M 8/04089 |
| 2020/0112041 A1* | 4/2020 | Ito | ........................ | H01M 16/00 |

FOREIGN PATENT DOCUMENTS

| | | |
|---|---|---|
| JP | 2016-096086 A | 5/2016 |
| JP | 2020-061228 A | 4/2020 |
| JP | 2020-061229 A | 4/2020 |

* cited by examiner

*Primary Examiner* — Brittany L Raymond
(74) *Attorney, Agent, or Firm* — Finnegan, Henderson, Farabow, Garrett & Dunner, LLP

(57) ABSTRACT

A fuel cell system includes: a fuel cell unit including first to nth fuel cells connected in series to each other to supply electric power to a load device; first to nth supply systems that independently supply cathode gas to the first to nth fuel cells, respectively; a switching device capable of switching a state between a connected state and a disconnected state; and a control unit, when required output to the fuel cell unit is equal to or smaller than a threshold value, configured to control the switching device to switch the state from the connected state to the disconnected state, and to control the first to nth supply systems to respectively control the first to nth fuel cells so as to respectively control flow rates of the cathode gas to be supplied to the first to nth fuel cells.

8 Claims, 19 Drawing Sheets

FIG. 3

|  | CONTROL TARGET | | TIME | | | | | | |
|---|---|---|---|---|---|---|---|---|---|
|  | LOWER LIMIT VALUE | UPPER LIMIT VALUE | t3 | t4 | t5 | t6 | t7 | t8 | t9 |
| VOLTAGE V1 | 75 | 85 | 85 | 77.5 | 77.5 | 75 | 85 | 79.5 | 79.5 |
| ESTIMATED VOLTAGE (Vt-V1) | (75) | (85) | 85 | 77.5 | 83.5 | 81 | 81 | 75.5 | 85.5 |
| TOTAL VOLTAGE Vt | 155 | 165 | 170 | 155 | 161 | 156 | 166 | 155 | 165 |

FIG. 8

|  | CONTROL TARGET | | TIME | | | | | | |
|---|---|---|---|---|---|---|---|---|---|
|  | LOWER LIMIT VALUE | UPPER LIMIT VALUE | t3 | t4 | t5 | t6 | t7 | t8 | t9 |
| VOLTAGE V1 | 75 | 85 | 85 | 81 | 85 | 79.5 | 79.5 | 75 | 85 |
| ESTIMATED VOLTAGE (Vt−V1) | (75) | (85) | 85 | 81 | 81 | 75.5 | 85.5 | 81 | 81 |
| TOTAL VOLTAGE Vt | 155 | 165 | 170 | 162 | 166 | 155 | 165 | 156 | 166 |

$(1/4) \leqq (U/T) \leqq (3/4)$

FIG. 17A

| | CONTROL TARGET | | TIME | | | | | | |
|---|---|---|---|---|---|---|---|---|---|
| | LOWER LIMIT VALUE | UPPER LIMIT VALUE | t3 | t4 | t5 | t6 | t7 | t8 | t9 |
| VOLTAGE V1 | 75 | 85 | 85 | 80 | 85 | 80 | 80 | 75 | 85 |
| ESTIMATED VOLTAGE (Vt-V1) | (150) | (170) | 170 | 160 | 160 | 150 | 170 | 160 | 160 |
| TOTAL VOLTAGE Vt | 230 | 250 | 255 | 240 | 245 | 230 | 250 | 235 | 245 |

FIG. 17B

| | CONTROL TARGET | | TIME | | | | | | |
|---|---|---|---|---|---|---|---|---|---|
| | LOWER LIMIT VALUE | UPPER LIMIT VALUE | t3 | t4 | t5 | t6 | t7 | t8 | t9 |
| VOLTAGE V1 | 150 | 170 | 170 | 160 | 170 | 156.7 | 156.7 | 150 | 170 |
| ESTIMATED VOLTAGE (Vt-V1) | (75) | (85) | 85 | 80 | 80 | 73.3 | 93.3 | 80 | 80 |
| TOTAL VOLTAGE Vt | 230 | 250 | 255 | 240 | 250 | 230 | 250 | 230 | 250 |

FUEL CELL SYSTEM

CROSS-REFERENCE TO RELATED APPLICATION

This application is based upon and claims the benefit of priority of the prior Japanese Patent Application No. 2020-217154, filed on Dec. 25, 2020, the entire contents of which are incorporated herein by reference.

FIELD OF THE INVENTION

The present disclosure relates to a fuel cell system.

BACKGROUND

When required output to a fuel cell unit including fuel cells connected to each other in parallel is low, power generation of the fuel cells stops, and when the required output increases, the power generation of the fuel cells restarts. In order to ensure the output responsiveness of the fuel cells to such required output when the power generation restarts, the amount of reactant gas to be supplied to each fuel cell is adjusted so as to maintain an open circuit voltage of each fuel cell between an upper limit value and a lower limit value, even in the power generation stop state (see, for example, Japanese Unexamined Patent Application Publication No. 2020-061228).

Even when the fuel cells are connected to each other in series, the output responsiveness of the fuel cells to the required output is required when the power generation restarts.

SUMMARY OF THE INVENTION

It is therefore an object of the present disclosure to provide a fuel cell system with good output responsiveness when power generation restarts.

The above object is achieved by a fuel cell system including: a fuel cell unit including first to nth (n is an integer equal to or greater than two) fuel cells connected in series to each other to supply electric power to a load device, the first to nth fuel cells each including same unit cells that are stacked; first to nth supply systems that independently supply cathode gas to the first to nth fuel cells, respectively; a switching device capable of switching a state between a connected state where the fuel cell unit and the load device are electrically connected to each other and a disconnected state where the fuel cell unit and the load device are electrically disconnected from each other; and a control unit, when required output to the fuel cell unit is equal to or smaller than a threshold value, configured to control the switching device to switch the state from the connected state to the disconnected state, and to control the first to nth supply systems to respectively control the first to nth fuel cells so as to respectively control flow rates of the cathode gas to be supplied to the first to nth fuel cells, wherein the number of stacked unit cells of the nth fuel cell is equal to or greater than the number of stacked unit cells of each of the first to (n−1)th fuel cells, the control unit is configured to include: an obtainer configured to obtain, in the disconnected state, first to (n−1)th open circuit voltages of respective open circuit voltages of the first to (n−1)th fuel cells, and a total open circuit voltage of the fuel cell unit; and a controller configured to respectively control the flow rates of the cathode gas to be supplied to the first to (n−1)th fuel cells to first to (n−1)th large flow rates so as to respectively increase the first to (n−1)th open circuit voltages, when the first to (n−1)th open circuit voltages are respectively equal to or lower than first to (n−1)th lower limit values, and configured to respectively control the flow rates of the cathode gas to be supplied to the first to (n−1)th fuel cells to first to (n−1)th small flow rates respectively smaller than first to (n−1)th large flow rates so as to respectively decrease the first to (n−1)th open circuit voltages, when the first to (n−1)th open circuit voltages are respectively equal to or higher than first to (n−1)th upper limit values, the controller is configured to control the flow rate of the cathode gas to be supplied to the nth fuel cells to a nth large flow rate so as to increase the total open circuit voltage, when the total open circuit voltage is equal to or lower than a nth lower limit value, and is configured to control the flow rate of the cathode gas to be supplied to the nth fuel cell to a nth small flow rate so as to decrease the total open circuit voltage, when the total open circuit voltage is equal to or higher than a nth upper limit value, a value obtained by dividing the nth lower limit value by the total number of stacked unit cells of the fuel cell unit is greater than each of values obtained by respectively dividing the first to (n−1)th lower limit values by the number of the stacked unit cells of the first to (n−1)th fuel cells.

The controller may be configured to switch the flow rate of the cathode gas to be supplied to the nth fuel cell to the nth small flow rate, when the total open circuit voltage is increasing for the first time since the switching device switches the state from the connected state to the disconnected state and before the total open circuit voltage reaches the nth upper limit value.

The controller may be configured to switch the flow rate of the cathode gas to be supplied to one of the first to (n−1)th fuel cells to a corresponding large flow rate, when the open circuit voltage of the one of the first to (n−1)th fuel cells is decreasing for the first time since the switching device switches the state from the connected state to the disconnected state and before the open circuit voltage of the one of the first to (n−1)th fuel cells reaches a corresponding lower limit value.

The controller may be configured to switch the flow rate of the cathode gas to be supplied to the nth fuel cell to the nth large flow rate, when the total open circuit voltage is equal to or lower than the nth lower limit value, and when at least one of the first to (n−1)th open circuit voltages is equal to or higher than a predetermined value between a corresponding upper limit value and a corresponding lower limit value.

First timing may be timing when anyone of the first to (n−1)th open circuit voltages reaches a corresponding lower limit value, second timing may be timing when one of two of the open circuit voltages, among the first to (n−1)th open circuit voltages and the total open circuit voltage, reaches a corresponding lower limit value, third timing may be timing when the other of the two of the open circuit voltages reaches a corresponding lower limit value, T may be a time interval between the first timing. U may be a time interval between the second timing and the third timing adjacent to and after the second timing, in a case where $(1/2n) > (U/T)$ is satisfied, the controller may be configured to switch the flow rate of the cathode gas to be supplied to the fuel cell corresponding the one of the two of the open circuit voltages to a corresponding large flow rate, when the one of the two of the open circuit voltages is decreasing before the one of the two of the open circuit voltages reaches a corresponding lower limit value, in a case where $(U/T) > (3/2n)$ is satisfied, the controller may be configured to switch the flow rate of the cathode gas to be supplied to the fuel cell corresponding the other of the two of the open circuit voltages to a corresponding large flow rate, when the other of the two of the open circuit voltages is decreasing before the other of the two of the open circuit voltages reaches a corresponding lower limit value.

Values obtained by respectively dividing the first to nth small flow rates by the number of stacked unit cells of the first to nth fuel cells may be equal to each other.

n=2 may be satisfied.

n=3 may be satisfied.

BRIEF DESCRIPTION OF THE DRAWINGS

FIG. 3 illustrates each voltage value in the first embodiment;

FIG. 8 illustrates each voltage value in the second embodiment;

FIG. 17A illustrates each voltage value in the fifth embodiment, and FIG. 17B illustrates each voltage value in the comparative example;

DETAILED DESCRIPTION

First Embodiment

[Fuel Cell System Configuration]

Figure 1:
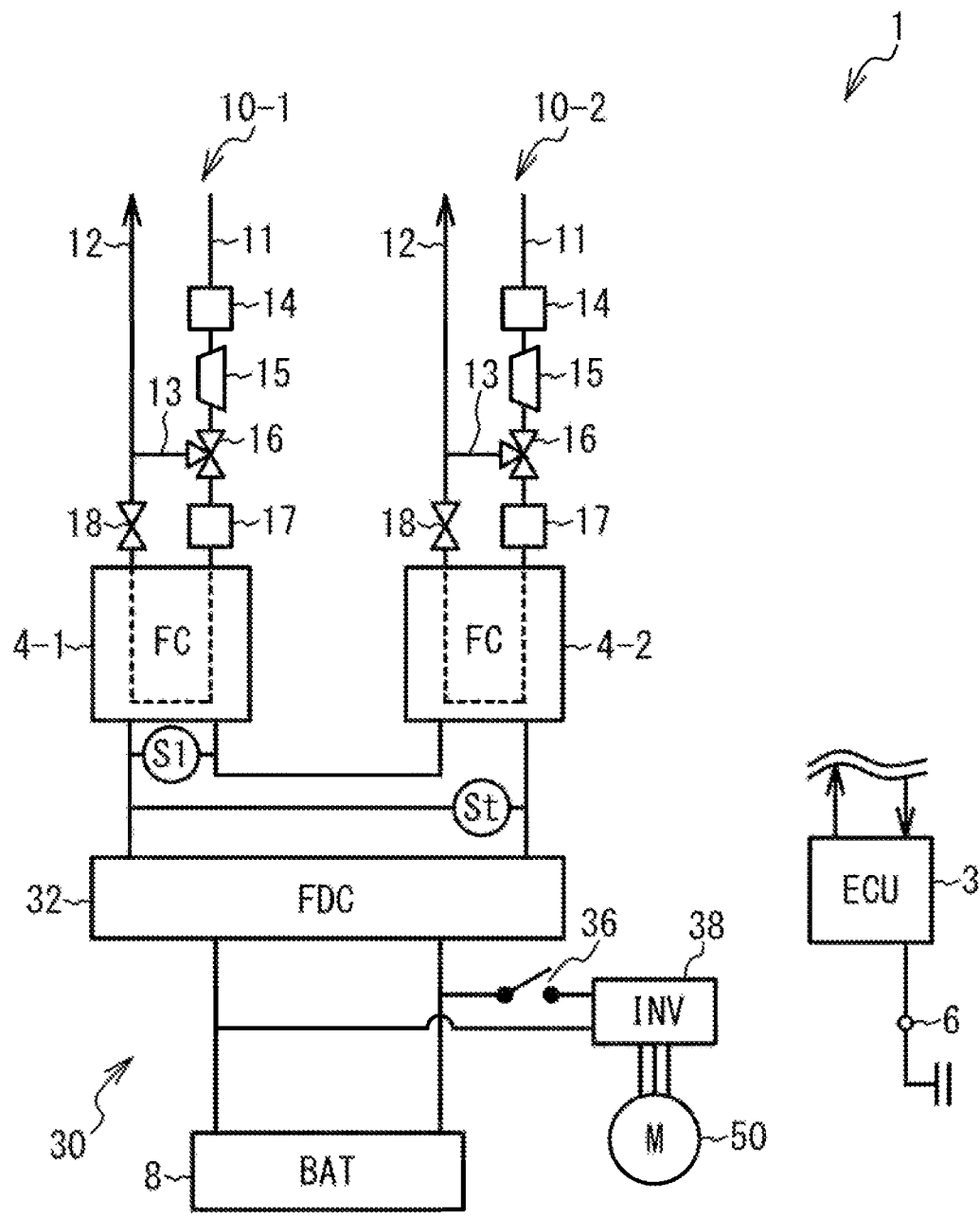
FIG. 1 is a schematic configuration view of a fuel cell system according to a first embodiment mounted on a vehicle.

FIG. 1 is a schematic configuration view of a fuel cell system 1 according to a first embodiment mounted on a vehicle. The fuel cell system 1 includes an electronic control unit (ECU) 3, fuel cells (hereinafter referred to as FCs) 4-1 and 4-2, a secondary battery (hereinafter referred to as BAT) 8, and cathode gas supply systems 10-1 and 10-2, and a power control system 30. The fuel cell system 1 includes anode gas supply systems (not illustrated) capable of independently and respectively supplying anode gas to the FCs 4-1 and 4-2, and a cooling system (not illustrated) capable of cooling the FCs 4-1 and 4-2 by circulating cooling water therethrough. Further, the vehicle is provided with an accelerator opening sensor 6, a motor 50 for traveling, and wheels (not illustrated) driven by the motor 50.

Each of the FCs 4-1 and 4-2 is the fuel cell that generates electricity by receiving cathode gas and anode gas. Each of the FCs 4-1 and 4-2 includes solid polymer electrolyte type unit cells that are stacked. In the first embodiment, the FCs 4-1 and 4-2 are the same as each other in used unit cell and in the number of stacked unit cells. Specifically, 100 unit cells are stacked in each of the FCs 4-1 and 4-2. The unit cells are the same as each other in size, in shape, and in material. The FCs 4-1 and 4-2 are electrically connected to each other in series. The FCs 4-1 and 4-2 are examples of a fuel cell unit, and are also examples of first and second fuel cells, respectively.

The cathode gas supply systems 10-1 and 10-2 are examples of first and second supply systems capable of independently supplying air containing oxygen as the cathode gas to the FCs 4-1 and 4-2, respectively. Specifically, each of the cathode gas supply systems 10-1 and 10-2 includes a supply pipe 11, a discharge pipe 12, a bypass pipe 13, an air cleaner 14, an air compressor 15, a bypass valve 16, an intercooler 17, and a back pressure valve 18. Since the cathode gas supply systems 10-1 and 10-2 have the same configuration, the cathode gas supply system 10-1 will be mainly described below.

Regarding the cathode gas supply system 10-1, the supply pipe 11 is connected to a cathode inlet manifold of the FC 4-1, and the discharge pipe 12 is connected to a cathode outlet manifold of the FC 4-1. The bypass pipe 13 communicates the supply pipe 11 with the discharge pipe 12. The bypass valve 16 is provided at a connecting portion of the supply pipe 11 and the bypass pipe 13, and switches the communication state between the supply pipe 11 and the bypass pipe 13. The air cleaner 14, the air compressor 15, the bypass valve 16, and the intercooler 17 are arranged on the supply pipe 11 in this order from the upstream side. The back pressure valve 18 is arranged on the discharge pipe 12 on the upstream side of the connecting portion of the discharge pipe 12 and the bypass pipe 13. The air cleaner 14 removes foreign matters such as dust in the air by a filter. The air compressor 15 supplies air, from which the foreign matters have been removed by the air cleaner 14, to the FC 4-1 via the supply pipe 11. The cathode gas supplied to the FC 4-1 is used for power generation of the FC 4-1 and then discharged through the discharge pipe 12. The intercooler 17 cools the cathode gas to be supplied to the FC 4-1. The back pressure valve 18 adjusts the back pressure on the cathode side of the FC 4-1. As described above, the cathode gas supply system 10-2 is configured in the same manner as the cathode gas supply system 10-1, and the supply pipe 11 and the discharge pipe 12 of the cathode gas supply system 10-2 are connected to a cathode inlet manifold and a cathode outlet manifold of the FC 4-2, respectively.

The power control system 30 includes a fuel cell DC/DC converter (hereinafter referred to as FDC) 32 and an inverter (hereinafter referred to as INV) 38 connected to the motor 50. The FDC 32 adjusts DC power from the FCs 4-1 and 4-2 and outputs it to the INV 38. The BAT 8 outputs DC power to the INV 38. The BAT 8 is capable of storing the generated power of the FCs 4-1 and 4-2. The INV 38 converts the input DC power into three-phase AC power and supplies it to the motor 50. The motor 50 drives the wheels (not illustrated) to drive the vehicle. Between the FDC 32 and the BAT 8, and the INV 38, a changeover switch 36 capable of switching an electric state between the connected state and the disconnected state is provided. A converter for adjusting the DC power from the BAT 8 may be provided between the changeover switch 36 and the BAT 8.

The electric power of the FCs 4-1 and 4-2 and the BAT 8 is capable of being supplied to the motor 50 which is an example of a load device. Herein, the load device includes auxiliary devices for the FCs 4-1 and 4-2 and auxiliary devices for the vehicle in addition to the motor 50. The auxiliary devices for the FCs 4-1 and 4-2 include the air compressors 15, the bypass valves 16, and the back pressure valves 18 of the cathode gas supply systems 10-1 and 10-2 described above, respectively. The auxiliary devices for the vehicle include, for example, an air conditioner, lighting devices, hazard lamps, and the like.

The FC 4-1 is provided with a voltage sensor S1 that detects a voltage of the FC 4-1. Further, a voltage sensor St for detecting a total voltage of the FCs 4-1 and 4-2, that is, the total voltage of the entire fuel cell unit is provided.

The ECU 3 includes a central processing unit (CPU), a read only memory (ROM), and a random access memory (RAM). The ECU 3 is electrically connected to the accelerator opening sensor 6, the air compressors 15, the bypass valves 16, the back pressure valves 18, the FDC 32, the changeover switch 36, and the voltage sensors S1 and St. The ECU 3 calculates a required output P to the whole of the FC 4-1 and 4-2 on the basis of a detection value of the accelerator opening sensor 6, the driving state of the auxiliary devices for the vehicle and for the FCs 4-1 and 4-2 described above, the stored power of the BAT 8, and the like. Further, according to the required output P, the ECU 3 controls auxiliary devices for the FCs 4-1 and 4-2 and controls the total generated power of the FCs 4-1 and 4-2. The required output P is the output required for the whole of the fuel cell unit of the FCs 4-1 and 4-2, and does not include the required output to a device, such as the BAT 8, other than the fuel cells.

[Open Circuit Voltage]

The ECU 3 executes open circuit voltage control that controls an open circuit voltage of the FC 4-1 and the total open circuit voltage of the FCs 4-1 and 4-2 (hereinafter, referred to as total open circuit voltage). The open circuit voltage control is executed by an obtainer and a controller functionally achieved by the CPU, ROM, and RAM.

For example, when the accelerator opening decreases, the required output P also decreases. When the required output P is equal to or smaller than a threshold value Pα described later, the changeover switch 36 electrically disconnects the FCs 4-1 and 4-2 from the load devices, so that the vehicle is in an idle operation state. Herein, in the disconnected state in which the FCs 4-1 and 4-2 are electrically disconnected from the load devices, the FCs 4-1 and 4-2 are in a power generation suspended state in which power generation is suspended. In the power generation suspended state, each current of the FCs 4-1 and 4-2 is zero, and each voltage thereof is called an open circuit voltage. When the accelerator opening increases again and the required output exceeds the threshold value in such an idle operation state, the changeover switch 36 electrically connects the FCs 4-1 and 4-2 to the load devices, and the FCs 4-1 and 4-2 return to the normal power generation state. As a result, the generated power of the FCs 4-1 and 4-2 is supplied to the motor 50, and the vehicle is brought into a traveling state.

Herein, in the disconnected state in which the FCs 4-1 and 4-2 are electrically disconnected from the load devices, oxygen and hydrogen are not consumed by power generation, but cross leak of hydrogen occurs from an anode electrode side to a cathode electrode side via an electrolyte membrane. Thus, hydrogen and oxygen react on the cathode electrode side to generate water. This reduces oxygen concentration on the cathode electrode side.

The open circuit voltage decreases due to the decrease in oxygen concentration on the cathode electrode side. In consideration of the responsiveness of the actual output of the FCs 4-1 and 4-2 when the required output P subsequently increases, the open circuit voltage may be maintained in a high state even in the disconnected state. This is because a high open circuit voltage indicates that the oxygen concentration on the cathode electrode side is high, and when the required output P increases in a state where the oxygen concentration is high on the cathode electrode side, the output of the FCs 4-1 and 4-2 increases with good responsiveness. However, if the open circuit voltage is always maintained at a high value, it is needed to constantly supply a large flow rate of the cathode gas to the FCs 4-1 and 4-2, which might increase power consumption. Further, if a large flow rate of cathode gas is constantly supplied to the FCs 4-1 and 4-2, the pressure on the cathode electrode side of the FCs 4-1 and 4-2 might increase excessively. Furthermore, when a large flow rate of the cathode gas is constantly supplied to the FCs 4-1 and 4-2 and the open circuit voltages increase above a predetermined value, the electrode catalysts of the FCs 4-1 and 4-2 might be eluted to degrade the power generation performance. Thus, the above-mentioned open circuit voltage control for maintaining the open circuit voltage within a predetermined target range is executed. In the open circuit voltage control, a flow rate of the cathode gas supplied to the FCs 4-1 and 4-2 is controlled to increase or decrease so as to maintain a voltage V1 of the FC 4-1 within a range between an upper limit value VH1 and a lower limit value VL1 and to maintain a total voltage Vt which is the total open circuit voltage of the FCs 4-1 and 4-2 within a range between an upper limit value VHt and a lower limit value VLt. The voltage range defined by the above upper limit value and lower limit value includes a predetermined margin, and a problem immediately does not occur when the open circuit voltage deviates from the above voltage range.

[Change in Voltage in Open Circuit Voltage Control in First Embodiment]

Figure 2:
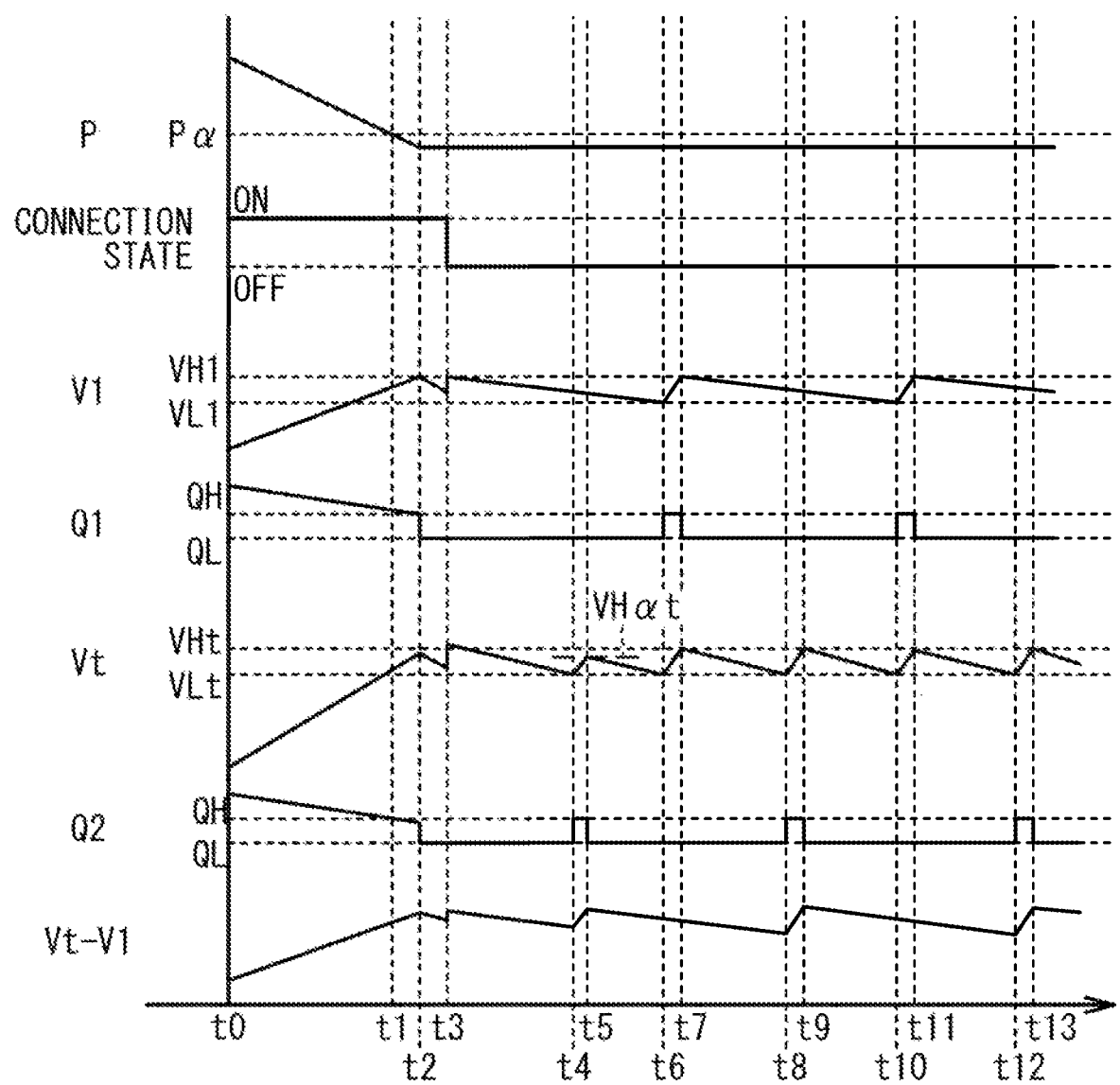
FIG. 2 is a timing chart illustrating an example of open circuit voltage control in the first embodiment.

Next, a change in voltage in the open circuit voltage control in the first embodiment will be described with reference to FIGS. 2 and 3. FIG. 2 is a timing chart illustrating an example of the open circuit voltage control in the first embodiment. FIG. 2 illustrates a change in the required output P, a connection state between the FCs 4-1 and 4-2 and the load devices, a change in flow rates Q1 and Q2 of the cathode gas to be respectively supplied to the FCs 4-1 and 4-2, a change in a voltage V1 of the FC 4-1, a change in a total voltage Vt of the FCs 4-1 and 4-2, and a change in an estimated voltage (Vt−V1). The estimated voltage (Vt−V1) is not obtained by the voltage sensor, but the voltage of the FC 4-2 is estimated from the voltage V1 and the total voltage Vt obtained by the voltage sensors S1 and St.

FIG. 3 illustrates each voltage in the first embodiment. FIG. 3 illustrates an example of values of the voltage V1, the estimated voltage (Vt−V1), and the total voltage Vt. Further, FIG. 3 illustrates examples of the upper limit value VH1 and the lower limit value VL1 of the voltage V1 of the FC 4-1 in the disconnected state in which the FC 4-1 is disconnected from the load devices, examples of the upper limit value VHt and the lower limit value VLt of the total voltage Vt in the disconnected state, and examples of the upper limit value and the lower limit value of the estimated voltage (Vt−V1).

The flow rate Q1 during the execution of the open circuit voltage control described below is controlled by adjusting an opening degree of the bypass valve 16 of the cathode gas supply system 10-1 while rotation speed of the air compressor 15 is kept constant and an opening degree of the back pressure valve 18 is kept constant. Likewise, the flow rate Q2 is controlled by adjusting the opening degree of the bypass valve 16 of the cathode gas supply system 10-2. However, the control of the flow rate Q1 is not limited to this, for example, the flow rate Q1 may be controlled by adjusting the rotation speed of the air compressor 15 of the cathode gas supply system 10-1 while the opening degree of the back pressure valve 18 is kept constant and the bypass valve 16 is kept constant. Likewise, the flow rate Q2 may be controlled by adjusting the rotation speed of the air compressor 15 of the cathode gas supply system 10-2.

For example, when the accelerator opening gradually decreases while the vehicle is traveling, the required output gradually decreases from time t0 as illustrated in FIG. 2. When the required output decreases, the flow rates Q1 and Q2 decrease so that the output of the FCs 4-1 and 4-2 decreases. Further, a decrease in each output of the FCs 4-1 and 4-2 decreases each current of the FCs 4-1 and 4-2, so that the voltage V1, the total voltage Vt, and the estimated voltage (Vt−V1) increase.

For example, when the accelerator opening reaches zero, the required output P becomes equal to or smaller than the threshold value Pα at time t1, and the changeover switch 36 is capable of switching the state to the disconnected state. The threshold value Pα is a preset value for determining whether or not the required output P is regarded as substantially zero, in other words, for determining whether or not there is no required output to the FCs 4-1 and 4-2. Since the required output P is sufficiently small at time t1, the changeover switch 36 may switch the state to the disconnected state. The threshold value Pa is not limited to substantially zero, and may be, for example, a value at which the electric power required for traveling the vehicle and for operating the auxiliary devices is sufficiently small and the electric power is supplied only from the BAT 8.

When the required output P becomes substantially constant at time t2 after a predetermined minute time elapses from time t1 when the required output P becomes equal to or smaller than the threshold value Pα, the flow rates Q1 and Q2 are each controlled to a predetermined small flow rate QL, and the vehicle shifts to an idle driving state. The small flow rate QL is smaller than a large flow rate QH described later. The small flow rate QL may be zero. By controlling each of the flow rates Q1 and Q2 to the small flow rate QL, the oxygen concentration at the cathode electrodes in the FCs 4-1 and 4-2 decreases, so that IV characteristics of the FCs 4-1 and 4-2 deteriorate as compared with those of a normal power generation state. Therefore, the voltage V1 and the total voltage Vt start to decrease from time 2.

At time 13 when a predetermined time elapses from time 12, the changeover switch 36 switches the state to the disconnected state, the FCs 4-1 and 4-2 are disconnected from the load devices, and the open circuit voltage control starts. As a result, the voltage V1 and the total voltage Vt increase immediately, and the currents of the FCs 4-1 and 4-2 are not illustrated but become zero. When the FCs 4-1 and 4-2 are disconnected from the load devices, the voltage V1 corresponds to the open circuit voltage of the FC 4-1, and the total voltage Vt corresponds to the total open circuit voltage of the FCs 4-1 and 4-2. As illustrated in FIG. 3, at time 3, each of the voltage V1 and the estimated voltage (Vt−V1) is 85 V, and the total voltage Vt is 170 V.

From time t3, the voltage V1 and the total voltage Vt decrease due to the cross leak described above. That is, the small flow rate QL is set such that the open circuit voltage does not increase even when the cross leak occurs. This is because a decrease rate of the oxygen concentration due to the cross leak changes depending on the usage environment and the usage time of the fuel cell, and it is difficult to predict the decrease rate beforehand.

At time t4, the total voltage Vt is 155 V, and each of the voltage V1 and the estimated voltage (Vt−V1) is 77.5 V. Herein, the lower limit value VLt of the total voltage Vt is set to 155 V. Therefore, at time 14, the flow rate Q2 of the cathode gas to the FC 4-2 is controlled to the predetermined large flow rate QH, and the total voltage Vt starts to increase. The large flow rate QH is set such that the oxygen concentration increases even when the decrease in oxygen concentration due to the cross leak is taken into consideration.

The total voltage Vt increases from time t4 to time t5 and reaches 161 V at time t5, and the estimated voltage (Vt−V1) also increases to 83.5 V, but the voltage V1 remains 77.5 V. Herein, when the total voltage Vt becomes equal to or higher than the initial upper limit value VHαt, which is the upper limit value in the case where the total voltage Vt increases for the first time since the changeover switch 36 switches the state to the disconnected state, the flow rate Q2 is controlled to the small flow rate QL again. The initial upper limit value VHαt is smaller than the upper limit value VHt and greater than the lower limit value VLt, and is set to 161 V in this embodiment. Therefore, the flow rate Q2 is switched to the small flow rate QL at time t5, and the total voltage Vt starts to decrease. Although the voltage V1 decreases from time t4 to time t5 in FIG. 2, the period from time t4 to time t5 is actually short and the voltage V1 is substantially the same value in this period, and this period is illustrated longer than it actually is, to facilitate understanding.

Both the voltage V1 and the total voltage Vt decrease from time t5 to time t6, and the voltage V1 is 75 V at time t6, the total voltage Vt is 156 V, and the estimated voltage (Vt−V1) is 81 V. Herein, since the lower limit value VL1 is set to 75 V in this embodiment, the flow rate Q1 is switched to the large flow rate QH at time t6, the voltage V1 starts to increase, and the total voltage Vt also starts to increase. At time t6, the total voltage Vt is 156 V which is higher than the lower limit value VLt of 155 V, so that the flow rate Q2 is maintained at the small flow rate QL.

At time t7, the voltage V1 reaches 85 V, the total voltage Vt reaches 166 V, and the estimated voltage (Vt−V1) remains 81 V. Herein, since the upper limit value VH1 is set to 85 V in this embodiment, the flow rate Q1 is switched to the small flow rate QL at time t7, the voltage V1 starts to decrease, and the total voltage Vt also starts to decrease. Like the period from time t4 to time t5, the period from time t6 to time t7 is short, and the estimated voltage (Vt−V1) is substantially the same value in this period.

At time t8, the total voltage Vt is 155 V, the voltage V1 is 79.5 V, and the estimated voltage (Vt−V1) is 75.5 V. As described above, when the total voltage Vt reaches 155 V, the flow rate Q2 is switched to the large flow rate QH and the total voltage Vt starts to increase.

At time t9, the total voltage Vt is 165 V, the voltage V1 is 79.5 V, and the estimated voltage (Vt−V1) is 85.5 V.

Herein, since the upper limit value VHt is set to 165 V in this embodiment, the flow rate Q2 is controlled by the small flow rate QL at time t9, and the total voltage Vt starts to decrease. Like the period from time t6 to time t7, the period from time t8 to time t9 is short, and the voltage V1 is substantially the same value in this period.

Likewise, when the voltage V1 reaches the lower limit value VL1 at time t10, the flow rate Q1 is switched to the large flow rate QH, and the voltage V1 and the total voltage Vt start to increase. When the voltage V1 reaches the upper limit value VH1 at time t11, the flow rate Q1 is controlled to the small flow rate QL, and the voltage V1 and the total voltage Vt start to decrease. When the total voltage Vt reaches the lower limit value VLt at time t12, the flow rate Q2 is switched to the large flow rate QH, and the total voltage Vt and the estimated voltage (Vt−V1) start to increase. When the total voltage Vt reaches the upper limit value VHt at time t13, the flow rate Q2 is switched to the small flow rate QL, and the total voltage Vt and the estimated voltage (Vt−V1) start to decrease.

In this way, the flow rates Q1 and Q2 are controlled to increase or decrease so that the voltage V1 and the total voltage Vt repeatedly increase and decrease within the target range. Herein, in this embodiment, as described above, the voltage V1 is basically maintained within the range between the upper limit value VH1 and the lower limit value VL1, that is, within the range between 85 V and 75 V, and the total voltage Vt is maintained within the range between the upper limit value VHt and the lower limit value VLt, that is, within the range between 165 V and 155 V.

Herein, since the number of the stacked unit cells of the FC 4-1 is 100, the upper limit value VH1$p$ and the lower limit value VL1$p$ of the voltage V1 per unit cell are respectively 0.85 V and 0.75 V calculated by diving the above-mentioned 85 V and 75 V by 100. Further, since the total number of the stacked unit cells of the FCs 4-1 and 4-2 is 200, the upper limit value VHtp and the lower limit value VLtp of the total voltage Vt per unit cell are respectively 0.825 V and 0.775 V calculated by diving the above-mentioned 165 V and 155 V by 200. In such a way, as for the lower limit value VLt of the total voltage Vt, the lower limit value VLtp per unit cell is 0.775 V, which is higher than 0.75 V of the lower limit value VL1$p$ per unit cell as for the lower limit value VL1 of the voltage V1.

The lower limit value VLt of the total voltage Vt is set to a relatively high value as described above, in consideration of ensuring the output responsiveness of the FCs 4-1 and 4-2 at the time when the power generation restarts. This ensures the output responsiveness of the FCs 4-1 and 4-2 at the time when the power generation of the FCs 4-1 and 4-2 restarts.

Further, as illustrated at time t4, the total voltage Vt reaches the lower limit value VLt before the voltage V1 reaches the lower limit value VL1, and the flow rate Q2 is switched from the small flow rate QL to the large flow rate QH before the flow rate Q1. Therefore, time t4 when the total voltage Vt reaches the lower limit value VLt is deviated from time t6 when the voltage V1 reaches the lower limit value VL1. Herein, the flow rates Q1 and Q2 are controlled to the large flow rate QH or the small flow rate QL, respectively. Further, since the FCs 4-1 and 4-2 are the same as each other in used unit cell and in the number of the stacked unit cells as described above, the increasing speed and the decreasing speed of the voltage V1 are respectively and substantially the same as the increasing speed and the decreasing speed of the estimated voltage (Vt−V1) that is estimated as the open circuit voltage of the FC 4-2. Therefore, once the timing when the total voltage Vt reaches the lower limit value VLt is deviated from the timing when the voltage V1 reaches the lower limit value VL1, a state where both the timing are deviated from each other at least for a predetermined period is maintained as in time t8, time t10, and time t12.

Herein, a case where both the timing match means that both the voltage V1 of the FC 4-1 and the voltage of the FC 4-2 are low. For example, if the power generation restarts in this state, the output responsiveness at the time of restarting the power generation might deteriorate. Therefore, in consideration of a case where both the timing match, in order to ensure the output responsiveness at the time of restarting the power generation, it is conceivable that the lower limit value VL1$p$ of the voltage V1 per unit cell is set to the same as the lower limit value VLtp of the total voltage Vt per unit cell. However, both the timing are deviated from each other in this embodiment as described above, so that the lower limit value VL1$p$ is set to a value smaller than the lower limit value VLtp. It is thus possible to ensure a wide range in which the voltage V1 is maintained, and to reduce a switching frequency of the flow rate Q1, that is, a switching frequency of the bypass valve 16 of the cathode gas supply system 10-1 in this embodiment. This suppresses a decrease in durability of the bypass valve 16 of the cathode gas supply system 10-1. Additionally, in a case where the flow rate Q1 is switched by increasing or decreasing the rotation speed of the air compressor 15 of the cathode gas supply system 10-1, it is possible to suppress a decrease in durability of the air compressor 15 of the cathode gas supply system 10-1.

Further, by using the initial upper limit value VHαt as illustrated at time t5, the timing when the voltage V1 reaches the lower limit value VL1 and the timing when the total voltage Vt reaches the lower limit value VLt are alternately and substantially evenly deviated from each other. Also, the lower limit value VL1$p$ of the voltage V1 per unit cell is set to a value smaller than the lower limit value VLtp of the total voltage Vt per unit cell. It is thus possible to reduce the switching frequency of the bypass valve 16 of the cathode gas supply system 10-1, which suppresses the decrease in durability of the bypass valve 16 of the cathode gas supply system 10-1.

[Flowchart of Power Generation Control in First Embodiment]

Figure 4:
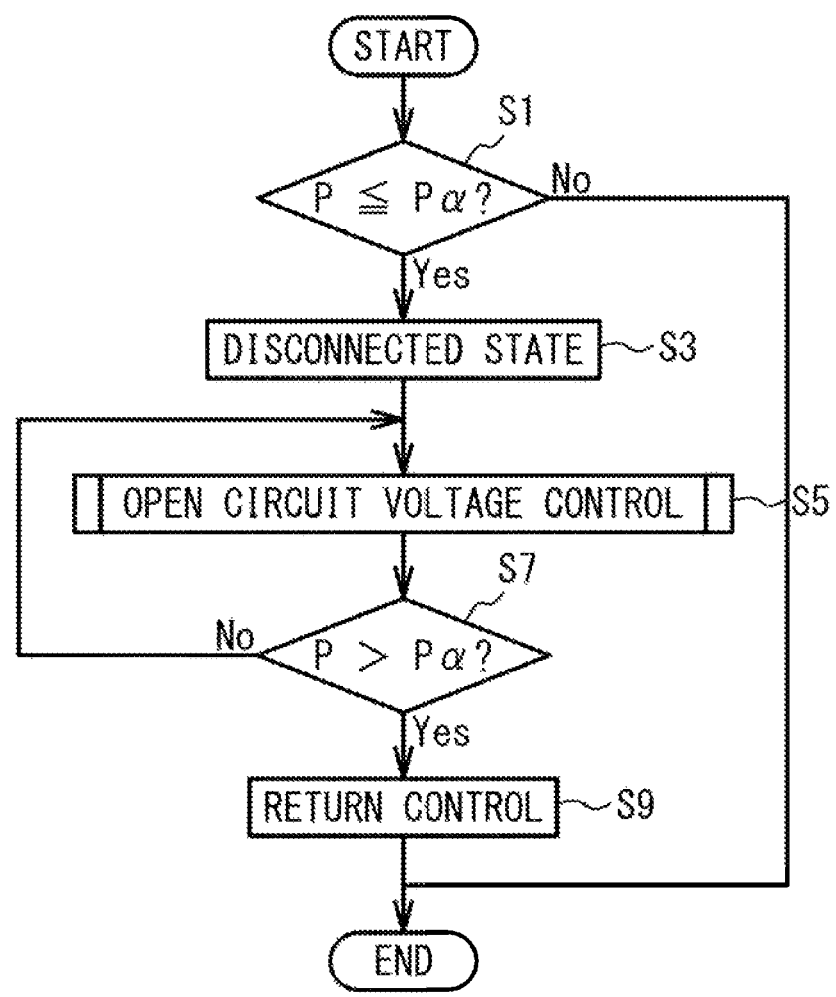
FIG. 4 is a flowchart illustrating an example of power generation control in the first embodiment.

FIG. 4 is a flowchart illustrating an example of the power generation control in the first embodiment. First, the ECU 3 determines whether or not the required output P is equal to or smaller than the threshold value Pα (step S1). As described above, the ECU 3 calculates the required output P based on the electric power required to drive the motor 50, the auxiliary equipment, and the like. For example, when the accelerator opening is a value other than zero and the vehicle is in a traveling state, a negative determination is made in step S1 and this control ends.

For example, when the accelerator opening is zero, a positive determination is made in step S1, and the ECU 3 controls each of the flow rates Q1 and Q2 to the small flow rates QL, and then controls the changeover switch 36 to switch the state to the disconnected state after a predetermined time elapses (step S3). Thus, the FCs 4-1 and 4-2 are brought into the power generation suspended state, and the ECU 3 executes the open circuit voltage control for each of the FCs 4-1 and 4-2 (step S5). While the open circuit voltage control is being executed, the ECU 3 determines whether or not the required output P is higher than the threshold value Pα (step S7). When a negative determination is made in step S7, the open circuit voltage control is continued. When a positive determination is made in step S7, the ECU 3 executes return control for returning the FCs 4-1 and 4-2 to the normal power generation state (step S9). Specifically, the ECU 3 controls the changeover switch 36 to switch the state to the connected state, and controls each of the flow rates Q1 and Q2 to a flow rate larger than the large flow rate QH in accordance with the magnitude of the required output P.

[Flowchart of Open Circuit Voltage Control of FC 4-1 in First Embodiment]

Figure 5:
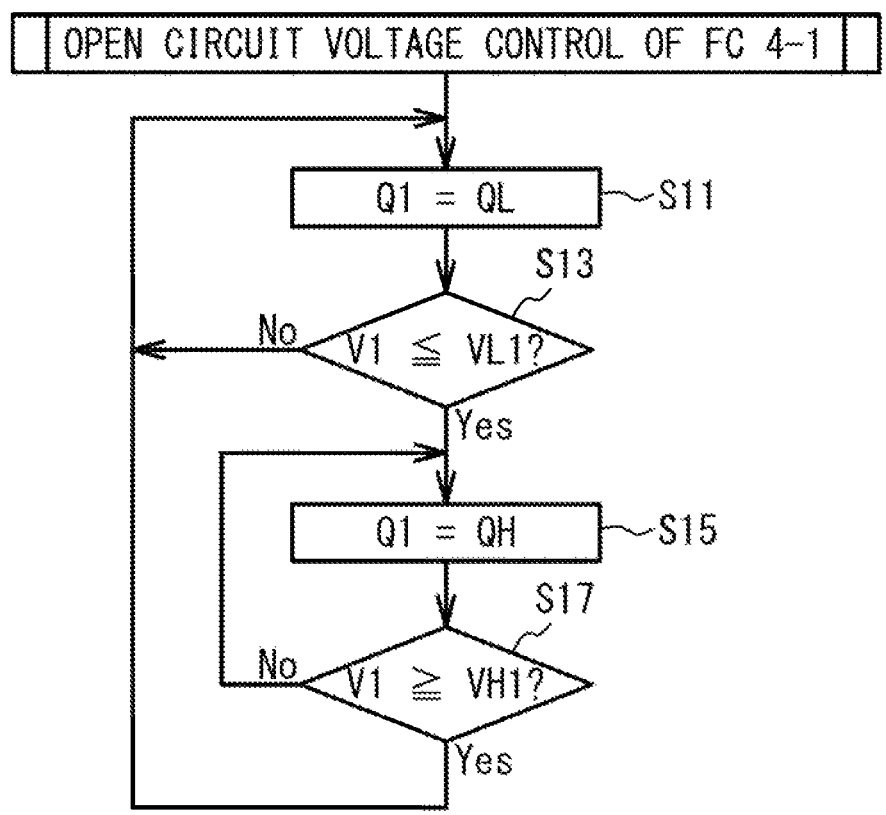
FIG. 5 is a flowchart illustrating an example of open circuit voltage control of an FC 4-1 in the first embodiment.

FIG. 5 is a flowchart illustrating an example of the open circuit voltage control of the FC 4-1 in the first embodiment. First, the ECU 3 controls the flow rate Q1 to the small flow rate QL (step S11). Next, the ECU 3 obtains the voltage V1 and determines whether or not the voltage V1 is equal to or smaller than the lower limit value VL1 (step S13). When a negative determination is made in step S13, the ECU 3 maintains the flow rate Q1 at the small flow rate QL (step S11).

When a positive determination is made in step S13, the ECU 3 controls the flow rate Q1 to the large flow rate QH, for example, as illustrated at time t6 and time t10 (step S15). Next, the ECU 3 obtains the voltage V1 and determines whether or not the voltage V1 is equal to or higher than the upper limit value VH1 (step S17). When a negative determination is made in step S17, the ECU 3 maintains the flow rate Q1 at the large flow rate QH (step S15). When a positive determination is made in step S17, the ECU 3 switches the flow rate Q1 to the small flow rate QL (step S11), for example, as illustrated at time t7 and time t11.

In this way, the voltage V1 is maintained between the upper limit value VH1 and the lower limit value VL1 by alternately switching the flow rate Q1 between the large flow rate QH and the small flow rate QL. Steps S11, S13, S15, and S17 are examples of processes executed by an obtainer and an controller.

[Flowchart of Open Circuit Voltage Control of FC 4-2 in First Embodiment]

Figure 6:
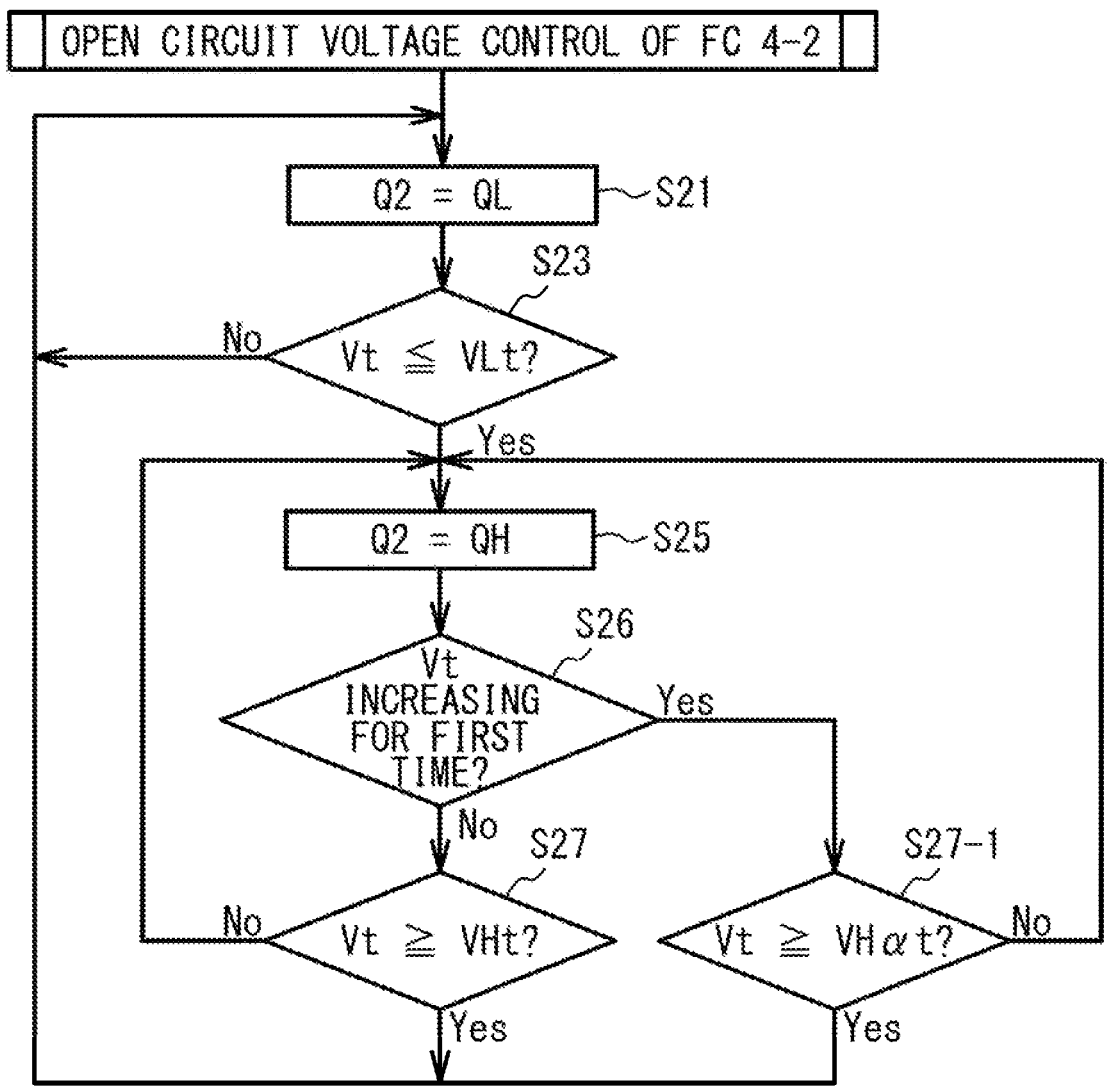
FIG. 6 is a flowchart illustrating an example of open circuit voltage control of an FC 4-2 in the first embodiment.

FIG. 6 is a flowchart illustrating an example of the open circuit voltage control of the FC 4-2 of the first embodiment. First, the ECU 3 controls the flow rate Q2 to the small flow rate QL (step S21). Next, the ECU 3 obtains the total voltage Vt and determines whether or not the total voltage Vt is equal to or smaller than the lower limit value VLt (step S23). When a negative determination is made in step S23, the ECU 3 maintains the flow rate Q2 at the small flow rate QL.

When a positive determination is made in step S23, the ECU 3 controls the flow rate Q2 to the large flow rate QH (step S25), for example, as illustrated at time t4 and time t8. Next, the ECU 3 obtains the total voltage Vt, and determines whether or not the total voltage Vt is increasing for the first time since the changeover switch 36 switches the state to the disconnected state (step S26). Herein, the increase for the first time means that the total voltage Vt reaches the lower limit value VLt or smaller for the first time since the changeover switch 36 switches the state to the disconnected state, and the flow rate Q2 is switched from the small flow rate QL to the large flow rate Q14 and then the total voltage Vt is increasing. In the determination of step S26, for example, to previously count the number of times when the total voltage Vt becomes equal to or smaller than the lower limit value VLt after the changeover switch 36 switches the state to the disconnected state, and when the counted value is one and the flow rate Q2 is controlled to the large flow rate QH, the total voltage Vt is determined to be increasing for the first time.

When a positive determination is made in step S26, that is, when the total voltage Vt is increasing for the first time, the ECU 3 obtains the total voltage Vt and determines whether or not the total voltage Vt is equal to or higher than the initial upper limit value VHαt (step S27-1). When a negative determination is made in step S27-1, the ECU 3 maintains the flow rate Q2 at the large flow rate QH (step S25). When a positive determination is made in step S27-1, the ECU 3 switches the flow rate Q2 to the small flow rate QL as illustrated at time t5 (step S21).

When a negative determination is made in step S26, that is, when the total voltage Vt is increasing after the first time, the ECU 3 obtains the total voltage Vt and determines whether or not the total voltage Vt is equal to or higher than the upper limit value VHt (step S27). When a negative determination is made in step S27, the ECU 3 maintains the flow rate Q2 at the large flow rate QH (step S25). When a positive determination is made in step S27, the ECU 3 switches the flow rate Q2 to the small flow rate QL as illustrated at time t9 (step S21).

In this way, the flow rate Q2 is alternately switched between the large flow rate QH and the small flow rate QL, so that the total voltage Vt is maintained between the upper limit value VHt and the lower limit value V1. Steps S21, S23, S25, S26, S27-1, and S27 are examples of processes executed by the obtainer and the controller.

In the first embodiment, the processes of steps S26 and S27-1 using the initial upper limit value VHαt are executed, but these processes are not always needed. In the first embodiment, the ECU 3 that integrally controls the cathode gas supply systems 10-1 and 10-2 has been described as an example. However, the present disclosure is not limited to this. For example, an ECU that controls the cathode gas supply system 10-1 and another ECU that controls the cathode gas supply system 10-2 may be individually provided. In the first embodiment, the number of stacked unit cells of each of the FCs 4-1 and 4-2 is 100. However, the number is not limited to this as long as the FCs 4-1 and 4-2 are the same as each other in the number of stacked unit cells. Further, as will be described in detail later, the number of stacked unit cells of the FC 4-2 may be equal to or greater than the number of stacked unit cells of the FC 4-1. The total voltage Vt is detected by the voltage sensor St, but not limited to this. Instead of the voltage sensor St, a voltage sensor that detects the voltage of only the FC 4-2 may be provided, and the total value of the detection values detected by this voltage sensor and the voltage sensor S1 may be used as the total voltage Vt.

Second Embodiment

Figure 7:
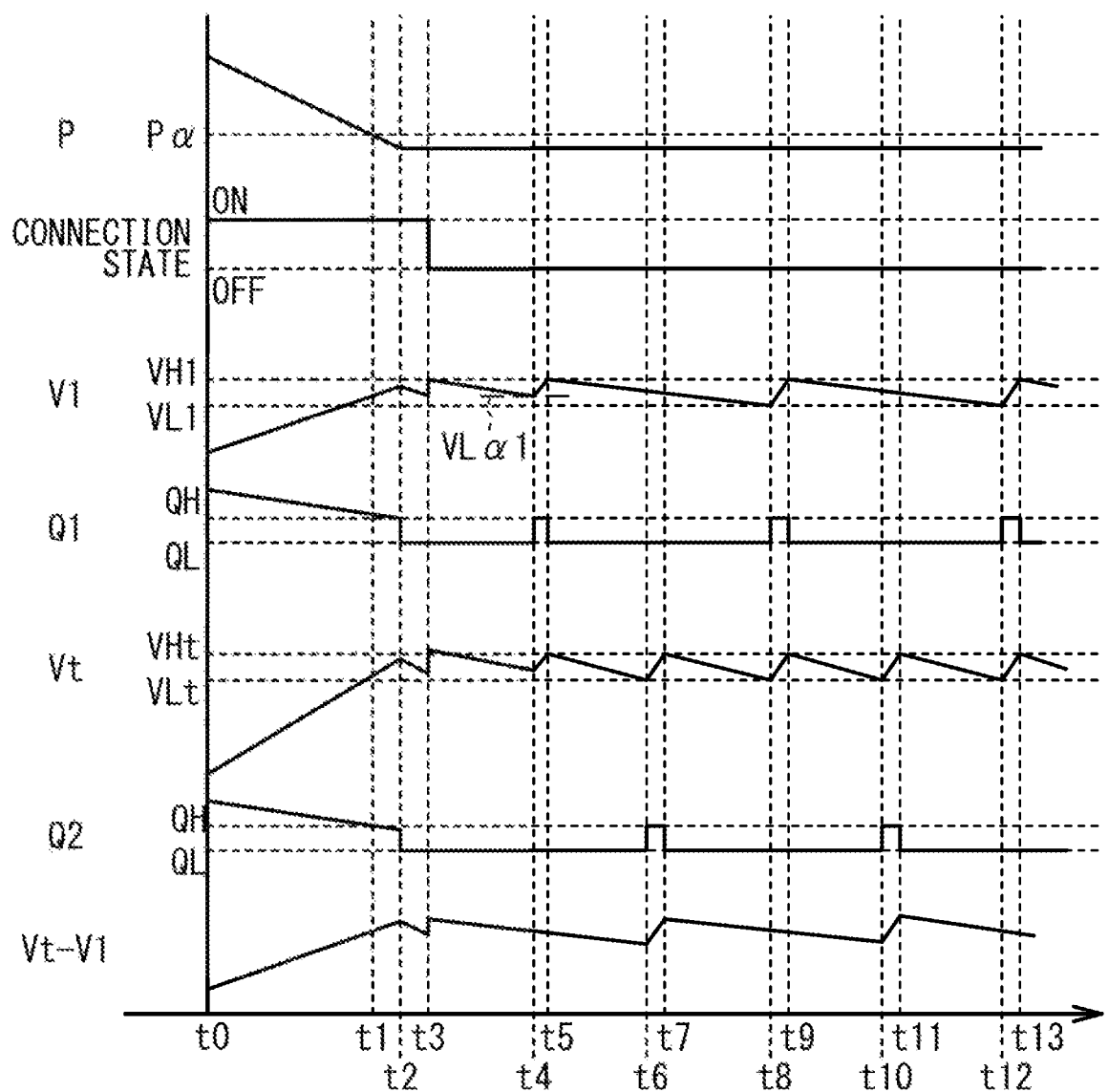
FIG. 7 is a timing chart illustrating an example of open circuit voltage control in a second embodiment.

In a second embodiment, the fuel cell system 1 illustrated in FIG. 1 is used, and open circuit voltage control of the FCs 4-1 and 4-2 executed by the ECU 3 differs from that in the first embodiment. FIG. 7 is a timing chart illustrating an example of the open circuit voltage control in the second embodiment. FIG. 8 illustrates each voltage value in the second embodiment. Like the first embodiment, in the second embodiment, the required output P becomes equal to or smaller than the threshold value Pα at time t1, the flow rates Q1 and Q2 are each controlled to the small flow rate QL at time t2, and the changeover switch 36 switches the state to the disconnected state at time t3. At time t3, as illustrated in FIG. 8, each of the voltage V1 and the estimated voltage (Vt−V1) is 85 V, and the total voltage Vt is 170 V.

At time t4, each of the voltage V1 and the estimated voltage (Vt−V1) is 81 V, and the total voltage Vt is 162 V. Herein, when the voltage V1 becomes equal to or lower than the initial lower limit value VLα1 which is the lower limit value in the case where the voltage V1 is decreasing for the first time since the changeover switch 36 switches the state to the disconnected state, the flow rate Q1 is controlled to the large flow rate QH again. The initial lower limit value VLαt is smaller than the upper limit value VH1 and greater than the lower limit value VL1, and is set to 81 V in this embodiment. Therefore, at time t4, the flow rate Q1 is switched to the large flow rate QH, and the voltage V1 starts to increase.

The voltage V1 increases from time t4 to time t5, and the total voltage Vt also increases. At time t5, the voltage V1 reaches 85 V and the total voltage Vt reaches 166 V but the estimated voltage (Vt−V1) remains 81 V. Since the upper limit value VH1 is 85 V, the flow rate Q1 is switched to the small flow rate QL at time t5, the voltage V1 starts to decrease, and the total voltage Vt also starts to decrease. Since the period from time 14 to time t5 is short, the estimated voltage (Vt−V1) is substantially the same value in this period.

At time t6, the total voltage Vt is 155 V, the voltage V1 is 79.5 V, and the estimated voltage (Vt−V1) is 75.5 V. Since the lower limit value VLt is 155 V, the flow rate Q2 is switched to the large flow rate QH at time t6, and the total voltage Vt starts to increase.

At time t7, the total voltage Vt is 165 V, the voltage V1 is 79.5 V, and the estimated voltage (Vt−V1) is 85.5 V. Since the upper limit value VHt is set to 165 V, the flow rate Q2 is controlled to the small flow rate QL at time 17, and the total voltage Vt starts to decrease. Since the period from time t6 to time t7 is short, the voltage V1 is substantially the same value in this period.

At time t8, the voltage V1 is 75 V the total voltage Vt is 156V. and the estimated voltage (Vt−V1) is 81 V. Herein, since the lower limit value VL1 is 75 V, the flow rate Q1 is switched to the large flow rate QH at time t8, and the voltage V1 starts to increase.

At time t9, the voltage V1 is 85 V, the total voltage Vt is 166 V, and the estimated voltage (Vt−V1) is 81 V. Herein, since the upper limit value VH1 is 85 V, the flow rate Q1 is controlled to the small flow rate QL at time t9, and the voltage V1 starts to decrease.

When the total voltage Vt reaches the lower limit value VLt at time t10, the flow rate Q2 is switched to the large flow rate QH, and the total voltage Vt and the estimated voltage (Vt−V1) start to increase. When the total voltage Vt reaches the upper limit value VHt at time t11, the flow rate Q2 is switched to the small flow rate QL, and the total voltage Vt and the estimated voltage (Vt−V1) start to decrease. When the voltage V1 reaches the lower limit value VL1 at time t12, the flow rate Q1 is switched to the large flow rate QH, and the voltage V1 and the total voltage Vt start to increase. When the voltage V1 reaches the upper limit value VH1 at time t13, the flow rate Q1 is controlled to the small flow rate QL, and the voltage V1 and the total voltage Vt start to decrease.

In this way, the flow rates Q1 and Q2 are controlled to increase or decrease so that each of the voltage V1 and the total voltage Vt repeatedly increase and decrease within the target range. Also in the second embodiment, the lower limit value VLt of the total voltage Vt is determined in consideration of ensuring the output responsiveness of the FCs 4-1 and 4-2 when the power generation restarts. Further, by using the initial lower limit value VLα1 as illustrated at time 4, the timing when the subsequent voltage V1 reaches the lower limit value VL1 and the timing when the total voltage Vt reaches the lower limit value VLt are alternately and substantially evenly deviated from each other. With the above configuration, it is also possible to set the lower limit value VL1p of the voltage V1 per unit cell to a value smaller than the lower limit value VLtp of the total voltage Vt per unit cell. This reduces the switching frequency of the bypass valve 16 of the cathode gas supply system 10-1, which suppresses a decrease in durability of the bypass valve 16 of the cathode gas supply system 10-1.

[Flowchart of Open Circuit Voltage Control of FC 4-1 in Second Embodiment]

Figure 9:
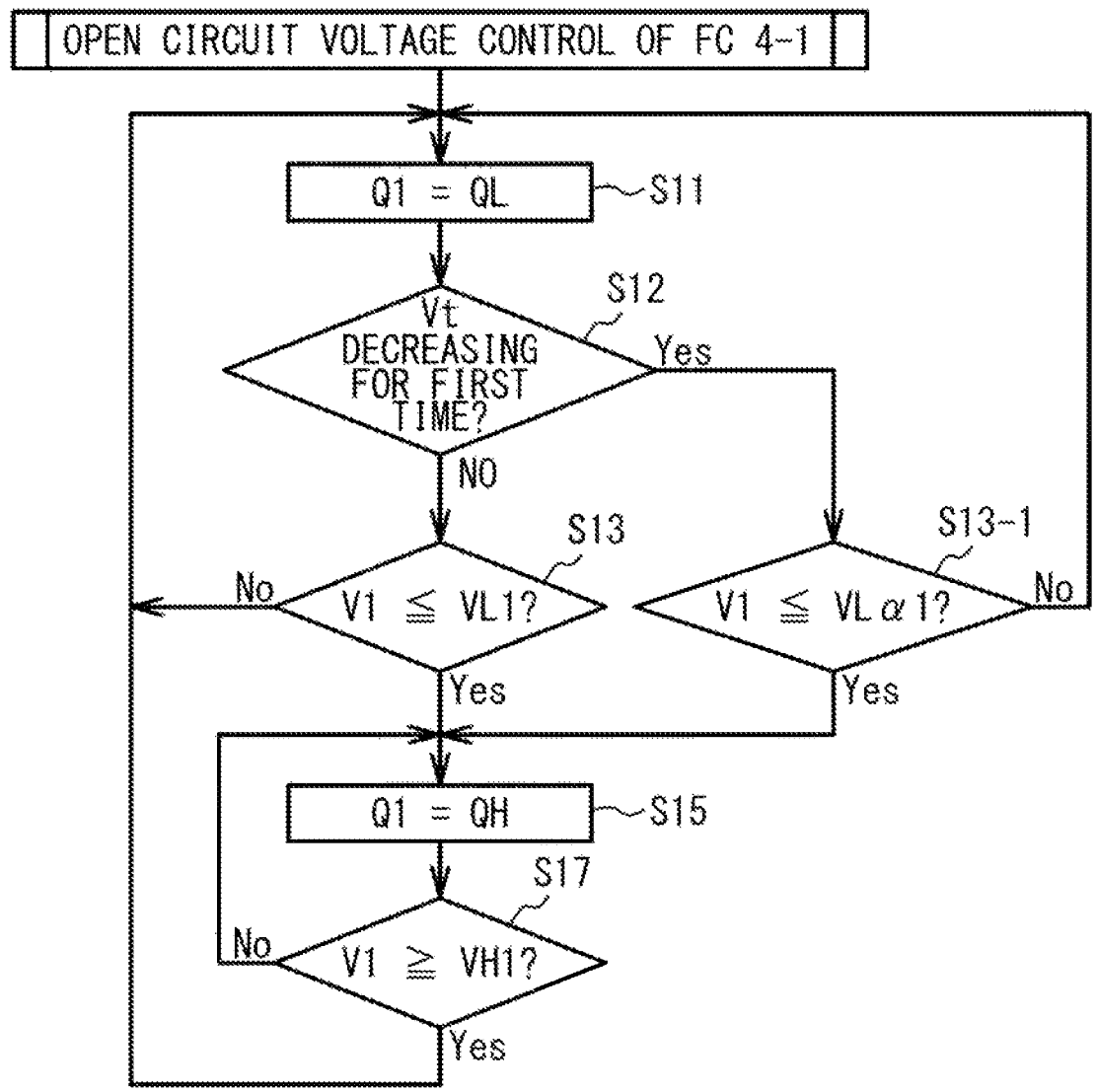
FIG. 9 is a flowchart illustrating an example of open circuit voltage control of the FC 4-1 in the second embodiment.

In the second embodiment, since the ECU 3 executes the control illustrated in FIG. 4 like the first embodiment, the open circuit voltage control of the FC 4-1 will be described. FIG. 9 is a flowchart illustrating an example of the open circuit voltage control of the FC 4-1 in the second embodiment. The ECU 3 controls the flow rate Q1 to the small flow rate QL (step S11), obtains the voltage V1, and determines whether or not the voltage V1 is decreasing for the first time since the changeover switch 36 switch the state to the disconnected state (step S12). Herein, the decreasing for the first time means a case where the flow rate Q1 is controlled to the small flow rate QL and the voltage V1 is decreasing for the first time since the changeover switch 36 switches the state to the disconnected state. In the determination in step S12, for example, when the voltage V1 becomes equal to or lower than the initial lower limit value VLα1 for the first time since the changeover switch 36 switches the state to the disconnected state, the voltage V1 is determined to be decreasing for the first time.

When a positive determination is made in step S12, that is, when the voltage V1 is decreasing for the first time, the ECU 3 obtains the voltage V1 and determines whether or not the voltage V1 is equal to or lower than the initial lower limit value VLα1 (step S13-1). When a negative determination is made in step S13-1, the ECU 3 maintains the flow rate Q1 at the small flow rate QL (step S11). When a positive determination is made in step S13-1, the ECU 3 switches the flow rate Q1 to the large flow rate QH (step S15), and then executes the process of step S17, as illustrated at time t4. When a negative determination is made in step S12, that is, when the voltage V1 is decreasing after the first time, the ECU 3 executes the processes of steps S13, S15, and S17 like the first embodiment.

In this way, the voltage V1 is controlled so as to repeatedly increase and decrease between the upper limit value VH1 and the lower limit value VL1. Steps S11, S12, S13-1, S13, S15, and S17 are examples of processes executed by the obtainer and the controller.

[Flowchart of Open Circuit Voltage Control of FC 4-2 in Second Embodiment]

Figure 10:
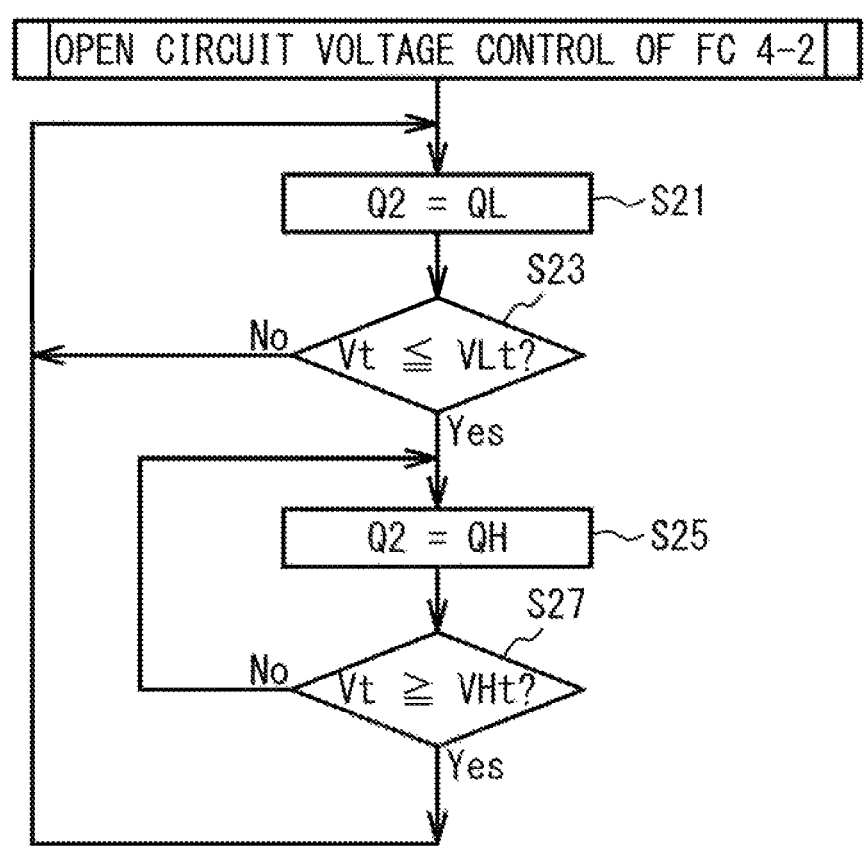
FIG. 10 is a flowchart illustrating an example of open circuit voltage control of the FC 4-2 in the second embodiment.

FIG. 10 is a flowchart illustrating an example of the open circuit voltage control of the FC 4-2 in the second embodiment. First, the ECU 3 controls the flow rate Q2 to the small flow rate QL (step S21). Next, the ECU 3 obtains the total voltage Vt and determines whether or not the total voltage Vt is equal to or lower than the lower limit value VLt (step S23). When a negative determination is made in step S23, the ECU 3 maintains the flow rate Q2 at the small flow rate QL (step S21).

When a positive determination is made in step S23, the ECU 3 controls the flow rate Q2 to the large flow rate QH (step S25). Next, the ECU 3 obtains the total voltage Vt and determines whether or not the total voltage Vt is equal to or higher than the upper limit value VHt (step S27). When a negative determination is made in step S27, the ECU 3 maintains the flow rate Q2 at the large flow rate QH (step S25). When a positive determination is made in step S27, the ECU 3 switches the flow rate Q2 to the small flow rate QL (step S21).

In this way, the total voltage Vt is controlled so as to repeatedly increase and decrease between the upper limit value VHt and the lower limit value VLt. Steps S21, S23, S25, and S27 are examples of processes executed by the obtainer and the controller.

Third Embodiment

In a third embodiment, the fuel cell system 1 illustrated in FIG. 1 is used, and the open circuit voltage control of the FC 4-2 executed by the ECU 3 differs from that in the first embodiment. Therefore, the control of the first embodiment illustrated in FIGS. 4 and 5 is also executed in the third embodiment.

[Flowchart of Open Circuit Voltage Control of FC 4-2 in Third Embodiment]

Figure 11:
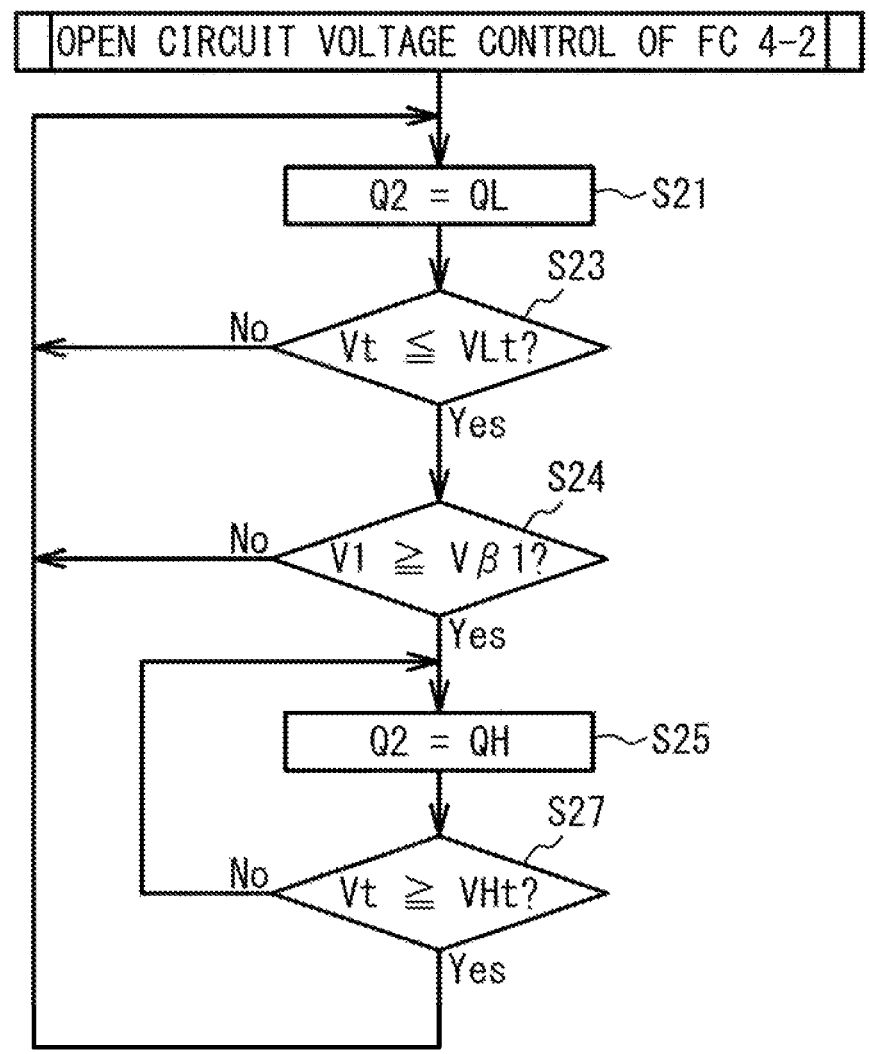
FIG. 11 is a flowchart illustrating an example of open circuit voltage control of the FC 4-2 in a third embodiment.

FIG. 11 is a flowchart illustrating an example of the open circuit voltage control of the FC 4-2 in the third embodiment. The ECU 3 executes the processes of steps S21 and S23. When a positive determination is made in step S23, the ECU 3 obtains the voltage V1 and determines whether or not the voltage V1 is equal to or higher than a reference value Vβ1 (step S24). The reference value Vβ1 is a value between the upper limit value VH1 and the lower limit value VL1 of the voltage V1, for example, a middle value between the upper limit value VH1 and the lower limit value VL1.

When a negative determination is made in step S24, the ECU 3 maintains the flow rate Q2 at the small flow rate QL even when the total voltage Vt is equal to or lower than the lower limit value VLt (step S21). When a positive determination is made in step S24, the ECU 3 switches the flow rate Q2 to the large flow rate QH (step S25), and then the process of step S27 is executed. That is, only when the total voltage Vt is equal to or lower than the lower limit value VLt and when the voltage V1 is a relatively high value equal to or higher than the reference value Vβ1, the flow rate Q2 is switched to the large flow rate QH and the total voltage Vt increases. When the voltage V1 is lower than the reference value Voi, the voltage V1 may be approaching the lower limit value VL1. Therefore, without switching the flow rate Q2 to the large flow rate QH at this timing to cause the total voltage Vt to increase, the voltage V1 reaches the lower limit value VL1 immediately, so that the flow rate Q1 is switched to the large flow rate QH to cause the voltage V1 to increase, and then the total voltage Vt increases. It is thus possible to prevent the timing when the voltage V1 reaches the lower limit value VL1 and the timing when the total voltage Vt reaches the lower limit value VLt from approaching each other. This reduces the switching frequency of the bypass valve 16 of the cathode gas supply system 10-1, which suppresses a decrease in durability of the bypass valve 16 of the cathode gas supply system 10-1.

In this way, the total voltage Vt is controlled so as to repeatedly increase and decrease between the upper limit value VHt and the lower limit value VLt. Steps S21, S23, S24, S25, and S27 are examples of processes executed by the obtainer and the controller.

Fourth Embodiment

In a fourth embodiment, the fuel cell system 1 illustrated in FIG. 1 is used, and the open circuit voltage control of the FC 4-1 and FC 4-2 executed by the ECU 3 differs from that in the first embodiment. Therefore, the control of the first embodiment illustrated in FIG. 4 is also executed in the fourth embodiment.

[Open Circuit Voltage Control in Fourth Embodiment]

Figure 12:
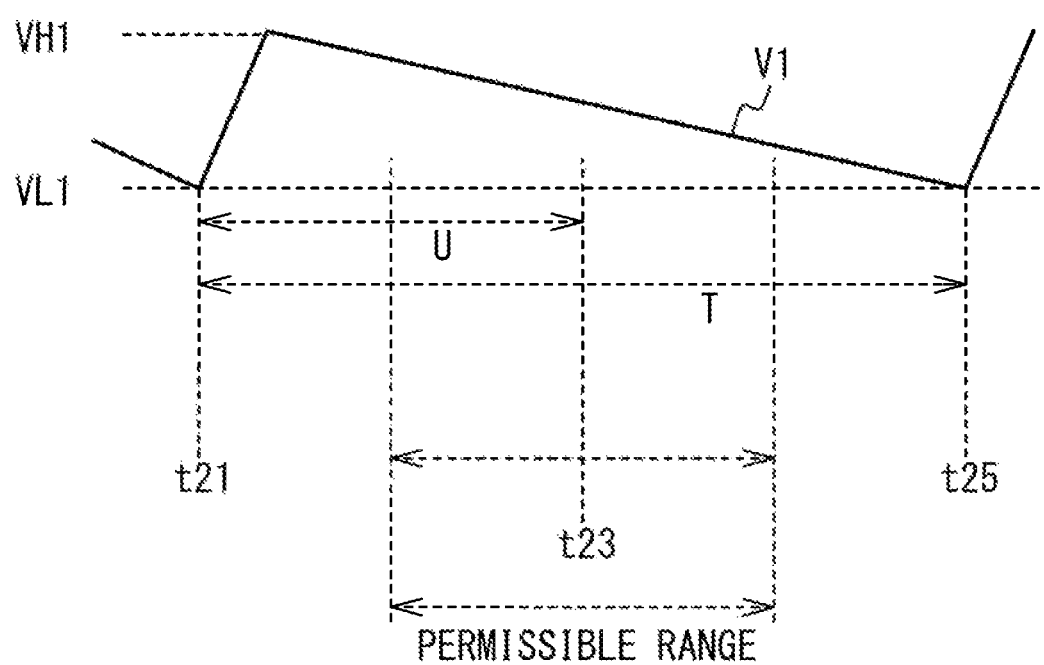
FIG. 12 is an explanatory view of open circuit voltage control in a fourth embodiment.

In the fourth embodiment, in a case where the timing when the voltage V1 reaches the lower limit value VL1 and the timing when the total voltage Vt reaches the lower limit value VLt are too close or too separate, the ECU 3 controls one of the voltage V1 and the total voltage Vt to increase, when this voltage is decreasing before reaching the corresponding lower limit value. FIG. 12 is an explanatory view of the open circuit voltage control in the fourth embodiment. FIG. 12 illustrates a case where the open circuit voltage control is being executed after the changeover switch 36 switches the state to the disconnected state. Further, FIG. 12 illustrates only the voltage V1, and the total voltage Vt is not illustrated.

The voltage V1 reaches the lower limit value VL1 at time 21, and then the voltage V1 reaches the lower limit value VL1 again at time t25. Herein, T indicates a time interval from time t21 to time 25. Each of time t21 and time t25 is the timing when the voltage V1 reaches the lower limit value VL1. Times t21 and t25 are examples of first timing. The ideal timing when the total voltage Vt reaches the lower limit value VLt is time t23, which is a middle time between time t21 and time t25. In this case, the time intervals between the timing when the voltage V1 reaches the lower limit value VL1 and the timing when the total voltage Vt reaches the lower limit value VLt are always constant. Herein, U indicates a time interval from time t21 to the timing when the total voltage Vt reaches the lower limit value VLt thereafter. The ideal timing when the total voltage Vt reaches the lower limit value VLt is expressed by $(U/T)=(1/2)$. Time t21 when the voltage V1 reaches the lower limit value VL1 is an example of the second timing. The timing when the total voltage Vt reaches the lower limit value VLt adjacent to the timing when the voltage V1 reaches the lower limit value VL1 is an example of the third timing. Alternatively, the timing when the total voltage Vt reaches the lower limit value VLt may be interpreted as an example of the second timing, and time t25 when the voltage V1 reaches the lower limit value VL1 adjacent to the timing when the total voltage Vt reaches the lower limit value VLt may be interpreted as an example of the third timing.

Herein, assuming that the amount of permissible deviation from the above ideal timing when the total voltage Vt reaches the lower limit value VLt is $(1/4)$, when $(1/4) \leq (U/T) \leq (3/4)$ is satisfied, the timing when the total voltage Vt reaches the lower limit value VLt falls within a permissible range. Therefore, in the fourth embodiment, when the above timing is out of the permissible range, the ECU 3 controls one of the voltage V1 and the total voltage Vt to increase, when this voltage is decreasing before reaching the corresponding lower limit value. Additionally, the ECU 3 constantly obtains and updates the time intervals U and T during the execution of the open circuit voltage control. The amount of permissible deviation is, but not limited to, $(1/4)$. For example, the amount of permissible deviation may be suitably set to $(1/5)$ or $(1/6)$, which is smaller than $(1/4)$.

(Flowchart of Open Circuit Voltage Control of the FC 4-1 in Fourth Embodiment)

Figure 13:
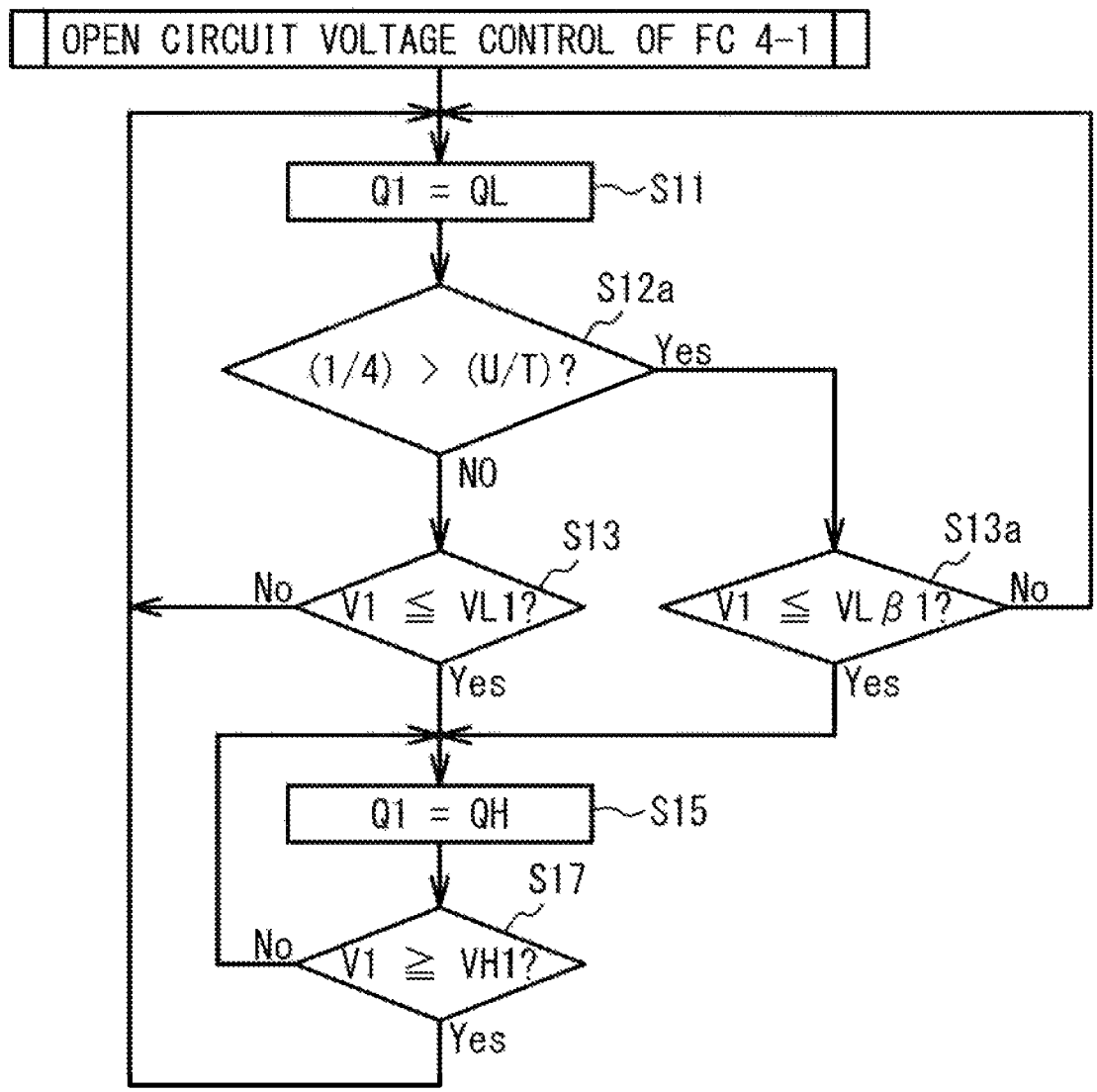
FIG. 13 is a flowchart illustrating an example of open circuit voltage control of the FC 4-1 in the fourth embodiment.

FIG. 13 is a flowchart illustrating an example of the open circuit voltage control of the FC 4-1 in the fourth embodiment. The ECU 3 executes the process of step S11. Next, the ECU 3 determines whether or not $(1/4)>(UT)$ is satisfied (step S12a). When a positive determination is made in step S12a, it is considered that the timing when the voltage V1 reaches the lower limit value VL1 and the timing when the total voltage Vt reaches the lower limit value VLt are too close to each other. When a negative determination is made in step S12a, the processes of steps S13, S15, and S17 are executed in the same manner like the first embodiment.

When a positive determination is made in step S12a, the ECU 3 obtains the voltage V1 and determines whether or not the voltage V1 is equal to or lower than a lower limit value VLβ1 for correction (step S13a). The lower limit value VLβ1 for correction is greater than the lower limit value VL1 and smaller than the upper limit value VH1. The lower limit value VLβ1 for correction is a value for correcting the timing when the voltage V1 reaches the lower limit value VL1 in a case where the timing when the voltage V1 reaches the lower limit value VL1 and the timing when the total voltage Vt reaches the lower limit value VL is too close as described above. When a negative determination is made in step S13a, the ECU 3 maintains the flow rate Q1 at the small flow rate QL (step S11).

When a positive determination is made in step S13a, the ECU 3 switches the flow rate Q1 to the large flow rate QH (step S15) and executes the process of step S17. As a result, the voltage V1 increases, when the voltage V1 is decreasing before reaching the lower limit value VL1. Therefore, the timing when the voltage V1 reaches the lower limit value VL1 and the timing when the total voltage Vt reaches the lower limit value VLt is brought closer to the ideal timing.

[Flowchart of Open Circuit Voltage Control of FC 4-2 in Fourth Embodiment]

Figure 14:
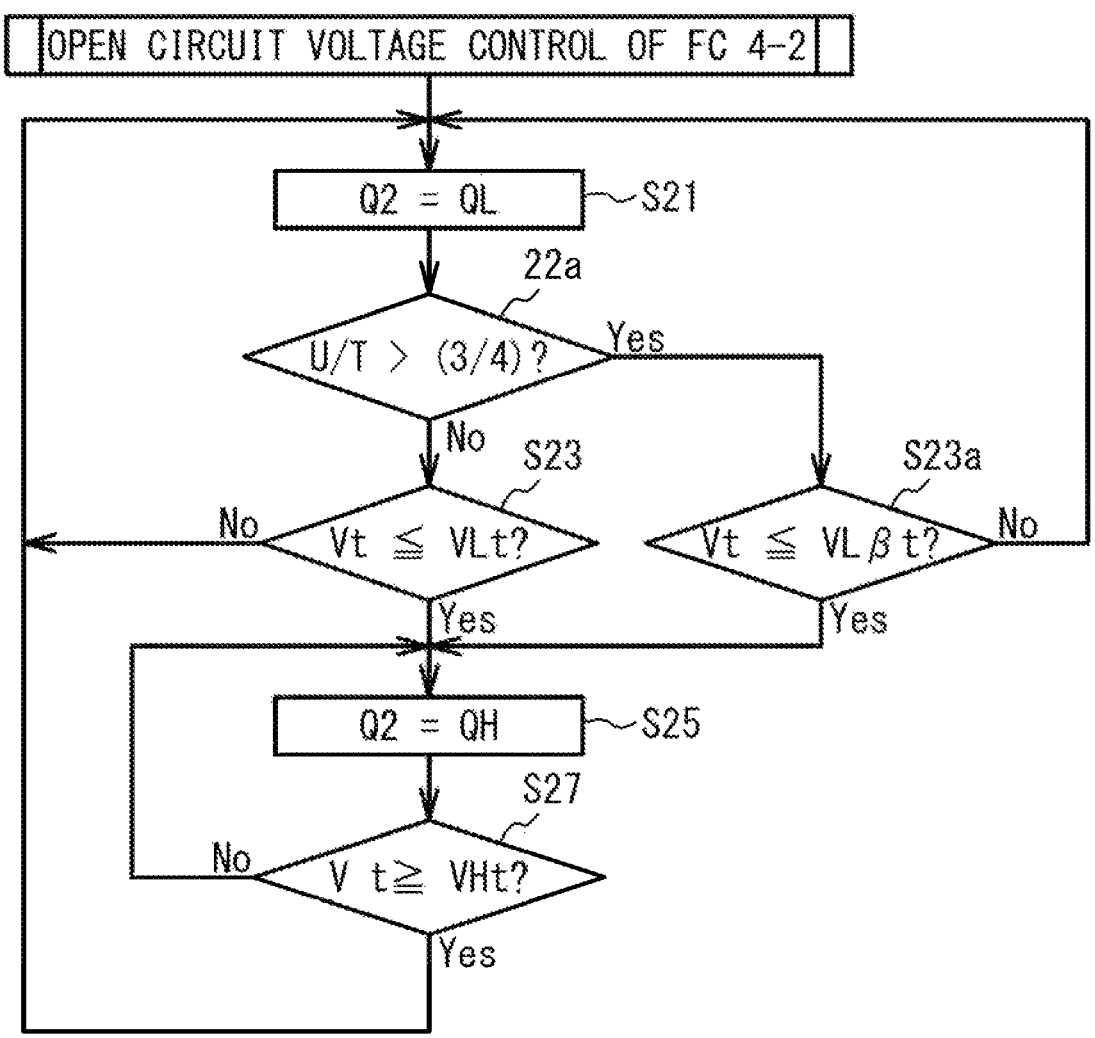
FIG. 14 is a flowchart illustrating an example of open circuit voltage control of the FC 4-2 in the fourth embodiment.

FIG. 14 is a flowchart illustrating an example of the open circuit voltage control of the FC 4-2 in the fourth embodiment. The ECU 3 controls the flow rate Q2 to the small flow rate QL (step S21). Next, the ECU 3 determines whether or not (U/T)>(¾) is satisfied (step S22a). When a positive determination is made in step S22a, it is considered that the timing when the voltage V1 reaches the lower limit value VL1 and the timing when the total voltage Vt reaches the lower limit value VLt are too far from each other. When a negative determination is made in step S22a, steps S23, S25, and S27 are executed in the same manner like the second embodiment.

When a positive determination is made in step S22a, the ECU 3 obtains the total voltage Vt and determines whether or not the total voltage Vt is equal to or lower than the lower limit value VLβt for correction (step S23a). The lower limit value VLβt for correction is greater than the lower limit value VLt and smaller than the upper limit value VHt. The lower limit value VLβt for correction is a value for correcting the timing when the total voltage Vt reaches the lower limit value VLt in a case where the timing when the voltage V1 reaches the lower limit value VL1 and the timing when the total voltage Vt reaches the lower limit value VLt is too far from each other as described above. When a negative determination is made in step S23a, the ECU 3 maintains the flow rate Q2 at the small flow rate QL (step S21).

When a positive determination is made in step S23a, the ECU 3 switches the flow rate Q2 to the large flow rate QH (step S25), and then executes the process of step S27. As a result, the total voltage Vt increases, when the total voltage Vt is decreasing before reaching the lower limit value VLt. Therefore, the timing when the voltage V1 reaches the lower limit value VL and the timing when the total voltage Vt reaches the lower limit value VLt is brought closer to the ideal timing.

In this way, the timing intervals at which the voltage V1 and the total voltage Vt respectively become the lower limit value VL1 and the lower limit value VLt is made constant.

Steps S11, S12a, S13, S13a, S15, S17, S21, S22a, S23, S23a, S25, and S27 are examples of processes executed by the obtainer and the controller.

Fifth Embodiment and Comparative Example

Figure 15:
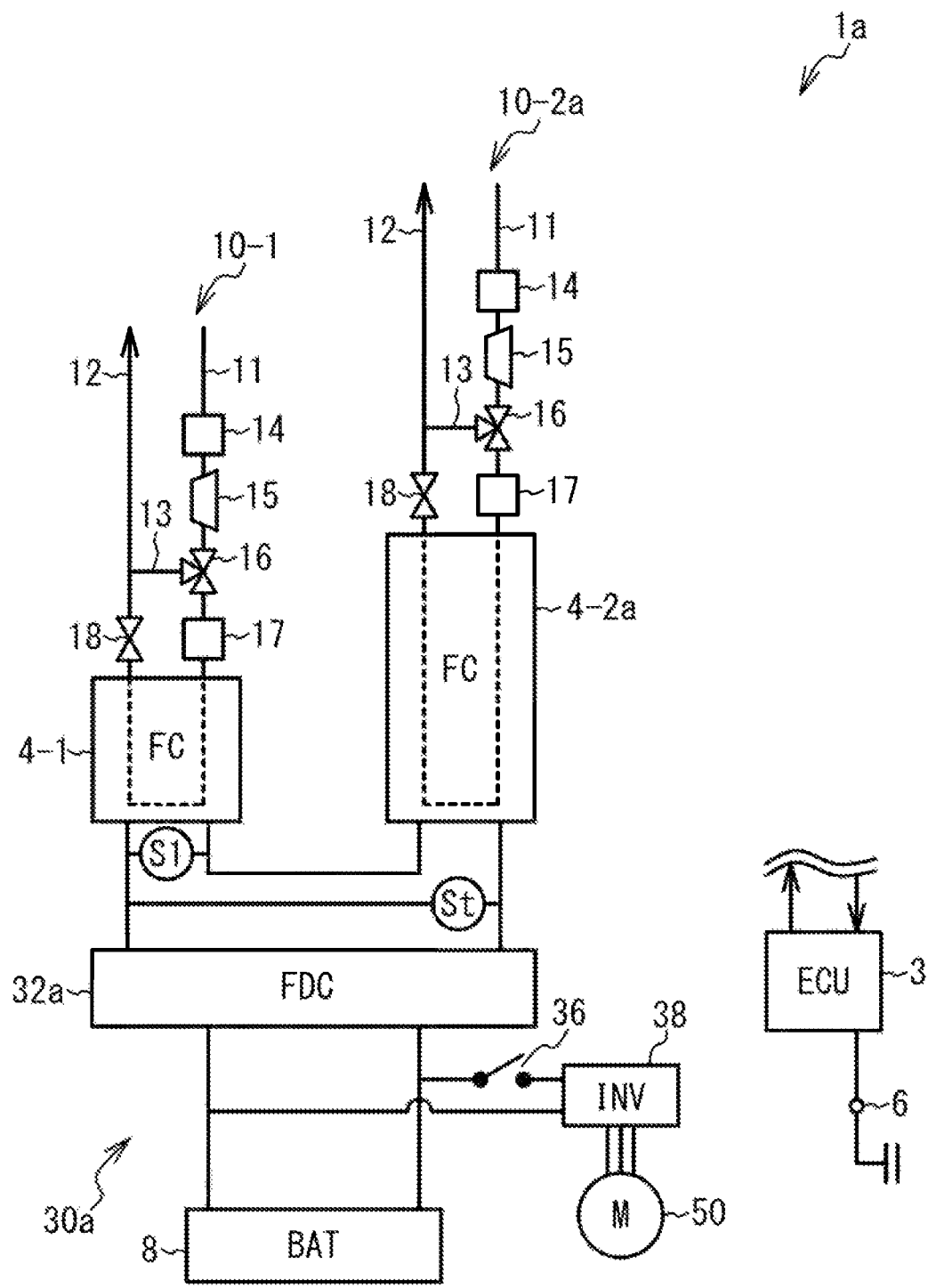
FIG. 15 is a schematic configuration view of a fuel cell system according to a fifth embodiment.

FIG. 15 is a schematic configuration view of a fuel cell system 1a according to a fifth embodiment. The same configuration as that of the fuel cell system 1 according to the first embodiment described above will be designated by the same reference numeral, and duplicated description will be omitted. The fuel cell system 1a includes an FC 4-2a, a cathode gas supply system 10-2a that supplies cathode gas to the FC 4-2a, and a power control system 30a. The number of stacked unit cells of the FC 4-2a is 200, which is twice the number of the stacked unit cells of the FC 4-1. The voltage sensor St detects the voltage of 300 unit cells in order to detect the total voltage of the FCs 4-1 and 4-2a. An FDC 32a of the power control system 30a adjusts the DC power from the FCs 4-1 and 4-2a and outputs the DC power to the INV 38.

The cathode gas supply system 10-2a adjusts a flow rate Q2a of the cathode gas supplied to the FC 4-2a, but in the open circuit voltage control, the flow rate Q2a is switched to a small flow rate QL2a or a large flow rate QH2a. The small flow rate QL2a and the large flow rate QH2a are twice the small flow rate QL and the large flow rate QH described above, respectively. Since the number of stacked unit cells of the FC 4-2a is twice the number of stacked unit cells of each of the FC 4-1 and the FC 4-2 in the first embodiment, the flow rate is also made to correspond to the number of stacked unit cells. As a result, a decrease rate of the estimated voltage (Vt−V1) corresponding to an estimated open circuit voltage per unit cell of the FC 4-2a in controlling the flow rate Q2a to the small flow rate QL2a is substantially the same as the decrease rate of the voltage V1 per unit cell of the FC 4-1 in controlling the flow rate Q1 to the small flow rate QL. Likewise, an increase rate of the estimated voltage (Vt−V1) corresponding to the estimated open circuit voltage per unit cell of the FC 4-2a in controlling the flow rate Q2a to the large flow rate QH2a is substantially the same as the increasing rate of the voltage V1 per unit cell of the FC 4-1 in controlling the flow rate Q1 to the large flow rate QH.

Figure 16:
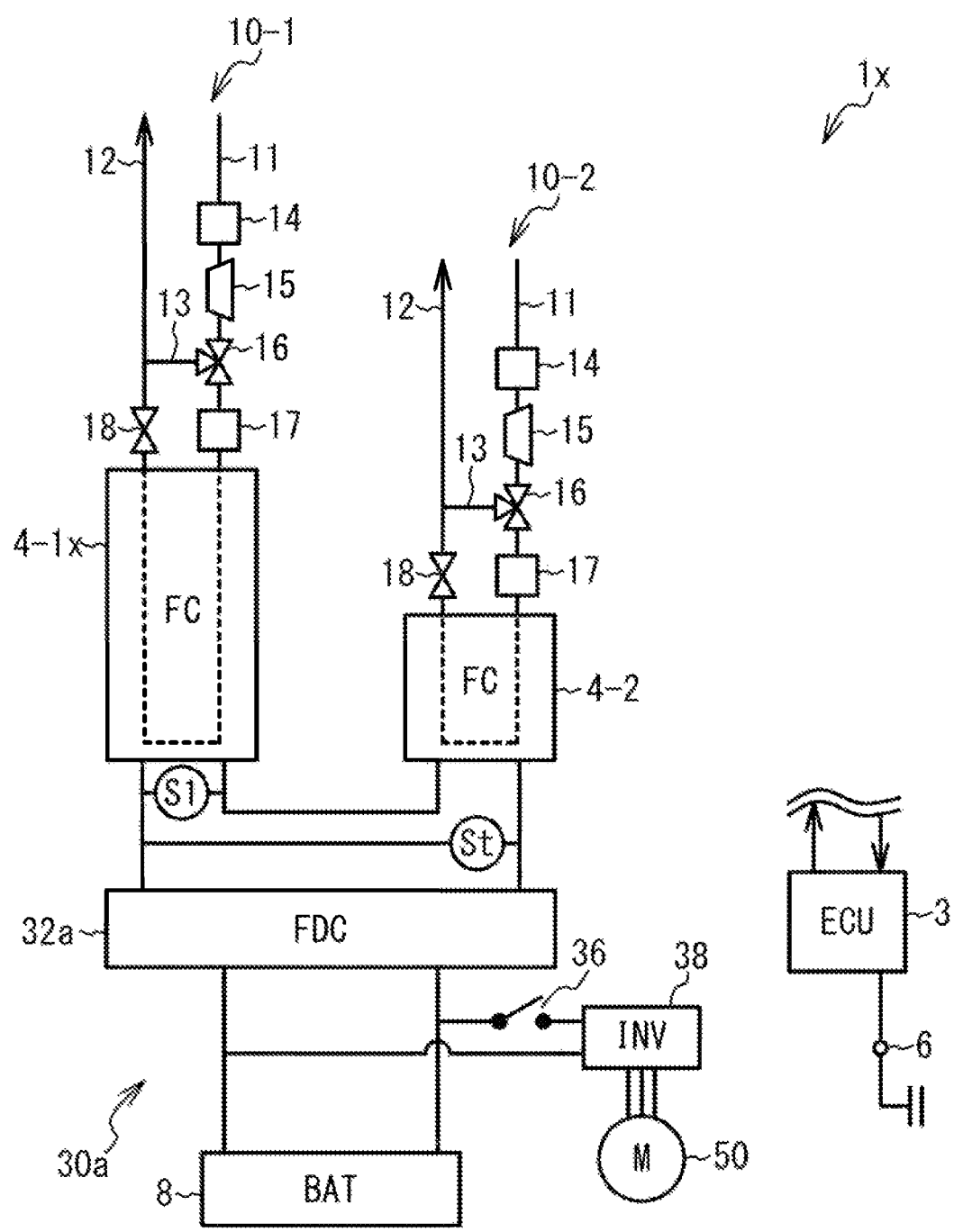
FIG. 16 is a schematic configuration view of a fuel cell system according to a comparative example.

FIG. 16 is a schematic configuration view of a fuel cell system 1x according to a comparative example. In the fuel cell system 1x according to the comparative example, the number of stacked unit cells in the FC 4-1x is 200, which is twice the number of stacked unit cells of the FC 4-2. In the comparative example, the voltage sensor S1 detects the voltage of the FC 4-1x. The cathode gas supply system 10-1x adjusts the flow rate Q1x of the cathode gas supplied to the FC 4-1x, but in the open circuit voltage control, the flow rate Q1x is switched to a small flow rate QL1x or a large flow rate QH1x. The small flow rate QL1x and the large flow rate QH1x are twice the small flow rate QL and the large flow rate QH described above, respectively.

An upper limit value VHt and a lower limit value VLt in the fifth embodiment are 250V and 230V, respectively. Since the total number of stacked unit cells of the FCs 4-1 and 4-2a is 300, an upper limit value VHtp and a lower limit value VLtp of the total voltage Vt per unit cell are 0.833 V and 0.767 V calculated by dividing 250 V and 230 V described above by 300, respectively. The upper limit value VH1 and the lower limit value VL1 of the voltage V1 are 85 V and 75 V, respectively like the first embodiment. The upper limit value VH1p and the lower limit value VL1p of the voltage V1 per unit cell are 0.85 V and 0.75 V, respectively. Therefore, the lower limit value VLtp is set to be higher than the lower limit value VL1p like the first embodiment.

In the comparative example like the fifth embodiment, the upper limit value VHt and the lower limit value VLt are 250 V and 230 V, respectively, and the upper limit value VHtp and the lower limit value VLtp of the total voltage Vt per unit cell are about 0.833 V and 0.767 V, respectively. The upper limit value VH1 and the lower limit value VL1 of the voltage V1 of the FC 4-1x are 170 V and 150 V, respectively. The upper limit value VH1p and the lower limit value VL1p of the voltage V1 per unit cell are 0.85 V and 0.75 V calculated by dividing 170 V and 150 V described above by 200, respectively, since the number of stacked unit cells of the FC 4-1x is 200,

[Each Voltage Value in Fifth Embodiment]

In the fifth embodiment and the comparative example, the ECU 3 executes the control illustrated in FIGS. 4, 9, and 10. FIG. 17A illustrates each voltage in the fifth embodiment. The changeover switch 36 switches the state to the disconnected state at time 3, the voltage V1 is 85 V, the total voltage Vt is 255 V, and the estimated voltage (Vt−V1) is 170 V.

At time t4, the voltage V1 is 80 V, the total voltage Vt is 240 V, and the estimated voltage (Vt−V1) is 160 V. Herein, when the voltage V1 becomes equal to or lower than an initial lower limit value VLα1 which is the lower limit value in a case where the voltage V1 is decreasing for the first time since the changeover switch 36 switches the state to the disconnected state, the flow rate Q1 is controlled to the large flow rate QH again. The initial lower limit value VLα1 is set to 80 V unlike the second embodiment. Therefore, at time t4, the flow rate Q1 is switched to the large flow rate QH, and the voltage V1 starts to increase.

The voltage V1 increases from time t4 to time t5, and the total voltage Vt also increases accordingly. At time t5, the voltage V1 reaches 85 V and the total voltage Vt reaches 245 V, but the estimated voltage (Vt−V1) remains 160 V.

At time t6, the total voltage Vt is 230 V, the voltage V1 is 80 V, and the estimated voltage (Vt−V1) is 150 V. Since the lower limit value VLt is 230 V, the flow rate Q2 is switched to the large flow rate QHa at time t6, and the total voltage Vt starts to increase.

At time t7, the total voltage Vt is 250 V, the voltage V1 is 80 V, and the estimated voltage (Vt−V1) is 170 V. Since the upper limit value VHt is 250 V the flow rate Q2 is controlled to the small flow rate QLa at time t7, and the total voltage Vt starts to decrease.

At time t8, the voltage V1 is 75 V, the total voltage Vt is 235 V, and the estimated voltage (Vt−V1) is 160 V. Herein, since the lower limit value VL1 is 75 V, the flow rate Q1 is switched to the large flow rate QH at time t8, and the voltage V1 starts to increase.

At time t9, the voltage V1 is 85 V, the total voltage Vt is 245 V, and the estimated voltage (Vt−V1) is 160 V. Herein, since the upper limit value VH1 is 85 V, the flow rate Q1 is controlled to the small flow rate QL at time t9, and the voltage V1 starts to decrease.

In this way, the flow rates Q1 and Q2a are controlled to increase or decrease so that each of the voltage V1 and the total voltage Vt repeatedly increases and decreases within the target range. Also in the fifth embodiment, the lower limit value VLt of the total voltage Vt is determined in consideration of ensuring the output responsiveness of the FCs 4-1 and 4-2a when the power generation restarts. Further, by using the initial lower limit value VLα1 as illustrated at time t4, the timing when the subsequent voltage V1 reaches the lower limit value VL1 and the timing when the total voltage Vt reaches the lower limit value VLt is alternately and constantly deviated from each other. Also, the lower limit value VL1p of the voltage V1 per unit cell is set to be smaller than the lower limit value VLtp of the total voltage Vt per unit cell. This reduces the switching frequency of the bypass valve 16 of the cathode gas supply system 10-1, which suppresses a decrease in durability of the bypass valve 16 of the cathode gas supply system 10-1.

Further, as described above, the decreasing rate and the increasing rate of the estimated voltage (Vt−V1) per unit cell of the FC 4-2a are substantially the same as the decreasing rate and the increasing rate of the voltage V1 per unit cell of the FC 4-1, respectively. Further, as described above, the number of stacked unit cells of the FC 4-2a is twice that of the FC 4-1. Therefore, the decreasing rate and the increasing rate of the estimated voltage (Vt−V1) are twice as fast as the decreasing rate and the increasing rate of the voltage V1, respectively. Corresponding to this, the difference between the upper limit value VHt and the lower limit value VLt of the total voltage Vt is 20 V, which is twice the difference, of 10 V, between the upper limit value VH1 and the lower limit value VL1 of the voltage V1. That is, the time required for the voltage V1 to decrease from the upper limit value VH1 to the lower limit value VL1 and the time required for the total voltage Vt to decrease from the upper limit value VHt to the lower limit value VLt are substantially the same. Therefore, once the timing when the voltage V1 reaches the lower limit value VL1 and the timing when the total voltage Vt reaches the lower limit value VLt is suitably deviated from each other, it is possible to maintain a state in which both timing is deviated from each other for a long period thereafter.

[Each Voltage Value in Comparative Example]

FIG. 17B illustrates each voltage value in the comparative example. At time t3, the changeover switch 36 switches the state to the disconnected state, the voltage V1 is 170 V, the total voltage Vt is 255 V, and the estimated voltage (Vt−V1) is 85 V.

At time t4, the voltage V1 is 160 V, the total voltage Vt is 240 V, and the estimated voltage (Vt−V1) is 80 V. Herein, when the voltage V1 becomes equal to or lower than an initial lower limit value VLαt which is the lower limit value in a case where the voltage V1 is decreasing for the first time since the changeover switch 36 switches the state to the disconnected state, the flow rate Q1x is controlled to the large flow rate QH1x again. The initial lower limit value VLα1 is set to 160 V Therefore, at time t4, the flow rate Q1x is switched to the large flow rate QH1x, and the voltage V1 starts to increase.

The voltage V1 increases from time t4 to time t5, and the total voltage Vt also increases. At time t5, the voltage V1 reaches 170 V and the total voltage Vt reaches 250 V, but the estimated voltage (Vt−V1) remains 80 V.

At time t6, the total voltage Vt is 230V and the voltage V1 is 156.7V, but the estimated voltage (Vt−V1) of the FC 4-2 is as low as 73.3 V. Since the lower limit value VLt is 230 V, the flow rate Q2 is switched to the large flow rate Q1 at time t6, and the total voltage Vt starts to increase.

The total voltage Vt increases from time t6, the total voltage Vt reaches 250 V at time t7, the estimated voltage (Vt−V1) reaches 93.3 V, and the voltage V1 remains 156.7 V. As described above, the estimated voltage (Vt−V1) estimated to be the open circuit voltage of the FC 4-2 becomes a high value, and the electrode catalyst might be easily eluted.

At time t8, the voltage V1 is 150 V, the total voltage Vt is 230 V, and the estimated voltage (Vt−V1) is 80 V. At time t8, since the voltage V1 is 150 V, the flow rate Q1x is switched to the large flow rate QH1x, and the voltage V1 and the total voltage Vt increase. At time t9, the voltage V1 is 170V the total voltage Vt is 250 V, and the estimated voltage (Vt−V1) remains 80 V.

As described above, in the comparative example, the number of stacked unit cells of the FC 4-1x in which the flow rate Q1x is controlled based on the voltage V1 is greater than the number of stacked unit cells of the FC 4-2 in which the flow rate Q2 is controlled based on the total voltage Vt. Thus, the change in the voltage V1 greatly influences on the total voltage Vt, which make it difficult to suitably control the flow rate Q2 based on the total voltage Vt. In the fifth embodiment, the number of stacked unit cells of the FC 4-2a in which the flow rate Q2 is controlled based on the total voltage Vt is greater than the number of stacked unit cells of the FC 4-1 in which the flow rate Q1 is controlled based on the voltage V1. It is thus possible to reduce the influence of the voltage V1 on the total voltage Vt and to suitably control the flow rate Q2 based on the total voltage Vt.

As in the fifth embodiment, the amplitude of the total voltage Vt corresponding to the difference between the upper limit value VHt and the lower limit value VLt may be greater than the amplitude of the voltage V1 corresponding to the difference between the upper limit value VH1 and the lower limit value VL1. This is because the decreasing rate of the total voltage Vt is faster than the decreasing rate of the voltage V1 as the number of stacked unit cells of the FC 4-2a is greater than the number of stacked unit cells of the FC 4-1, and the switching frequency of the flow rate Q2 might increase in a case where the amplitude of the total voltage Vt is equal to or smaller than the amplitude of the voltage V1. Further, as described above, if the upper limit value VHt of the total voltage Vt is too high in a case where the number of stacked unit cells of the FC 4-2 is smaller than the number of stacked unit cells of the FC 4-1x as in the comparative example, the estimated voltage (Vt−V1) corresponding to the open circuit voltage of the FC 4-2 might become high, and the electrode catalyst might easily elute. Thus, the number of stacked unit cells of the FC 4-2a may be greater than the number of stacked unit cells of the FC 4-1 as in the fifth embodiment.

In the fifth embodiment, the number of stacked unit cells of the FC 4-2a is 200, but the number of stacked unit cells of the FC 4-2a is not limited to 200, and the number of stacked unit cells of the FC 4-2a may be equal to or greater than the number of stacked unit cells of the FC 4-1. Further, in this case, the flow rate per unit cell obtained by dividing the small flow rate QL2a of the cathode gas supplied to the FC 4-2a by the number of stacked unit cells of the FC 4-2a may be substantially the same as the flow rate per unit cell obtained by dividing the small flow rate QL of the cathode gas supplied to the FC4-1 by the number of stacked unit cells of the FC 4-1. Likewise, the flow rate per unit cell obtained by dividing the large flow rate QH2a of the cathode gas supplied to the FC 4-2a by the number of stacked unit cells of the FC 4-2a may be substantially the same as the flow rate per unit cell obtained by dividing the large flow rate QH of the cathode gas supplied to the FC 4-1 by the number of stacked unit cells of the FC 4-1. As a result, the voltage V1 and the total voltage Vt are substantially the same as each other in the voltage decreasing rate per unit cell and in the increasing rate per unit cell.

In the fifth embodiment, the ECU 3 may execute the control illustrated in FIG. 5 for the FC 4-1 and the control illustrated in FIG. 6 or 11 for the FC 4-2a. Further, the ECU 3 may execute the control illustrated in FIG. 9 for the FC 4-1 and the control illustrated in FIG. 12 for the FC 4-2a. The ECU 3 may execute the control illustrated in FIG. 13 for the FC 4-1 and the control illustrated in FIG. 14 for the FC 4-2a.

Sixth Embodiment

Figure 18:
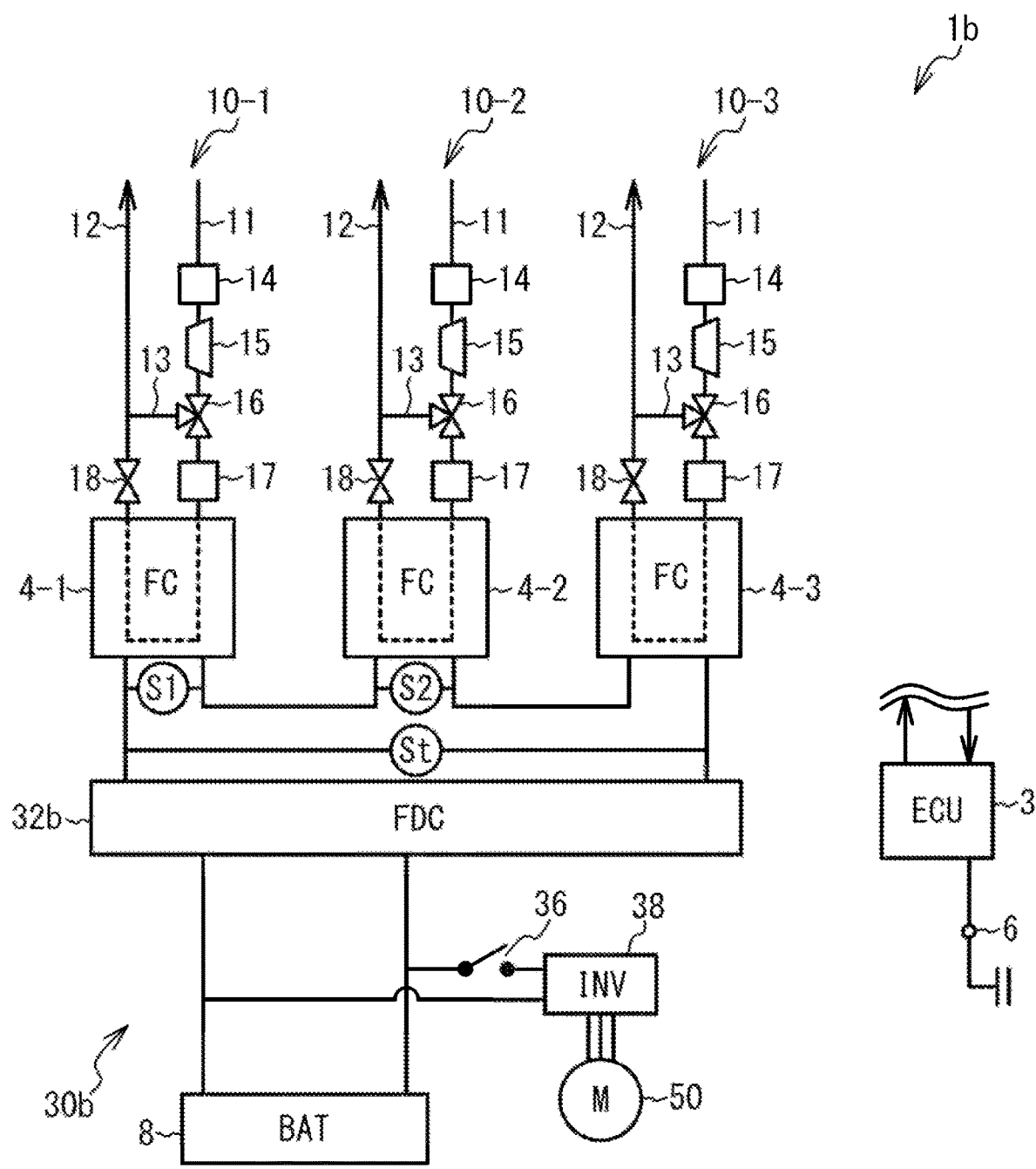
FIG. 18 is a schematic configuration view of a fuel cell system according to a sixth embodiment.

FIG. 18 is a schematic configuration view of a fuel cell system 1b according to a sixth embodiment. The fuel cell system 1b includes FCs 4-1, 4-2, and 4-3, cathode gas supply systems 10-1, 10-2, and 10-3, and a power control system 30b. In the FCs 4-1, 4-2, and 4-3, the same unit cells are stacked, and the number of unit cells in each of the FCs 4-1, 4-2, and 4-3 is the same as 100. The FCs 4-1, 4-2, and 4-3 are examples of fuel cell units. A voltage sensor S2 detects a voltage V2 of the FC 4-2. The voltage sensor St detects the total voltage Vt of the FCs 4-1, 4-2, and 4-3. An FDC 32b of the power control system 30b adjusts the DC power from the FCs 4-1, 4-2, and 4-3 and outputs the DC power to the INV38.

The cathode gas supply systems 10-1, 10-2, and 10-3 control the flow rates Q1, Q2, and Q3 of the cathode gas to be supplied to the FCs 4-1, 4-2, and 4-3, respectively. Specifically, in the open circuit voltage control, the flow rates Q1, Q2, and Q3 are controlled to either the small flow rate QL or the large flow rate QH, respectively. Therefore, in the open circuit voltage control, the decreasing rate of the voltage V1 per unit cell of the FC 4-1, the decreasing rate of the voltage V2 per unit cell of the FC 4-2, and the decreasing rate of the total voltage Vt per unit cell of whole of the fuel cell unit are substantially the same. Likewise, the increasing rates are substantially the same.

Like the first embodiment, the upper limit value VH1 and the lower limit value VL1 of the voltage V1 are respectively set to 85 V and 75 V, which are respectively the same as an upper limit value VH2 and a lower limit value VL2 of the voltage V2 set. Therefore, the upper limit value VH1p and the lower limit value VL1p of the voltage V1 per unit cell are respectively 0.85 V and 0.75 V, which are respectively the same as an upper limit value VH2p and a lower limit value VL2p of the voltage V2 per unit cell. The upper limit value VHt and the lower limit value VLt of the total voltage Vt are respectively set to 245 V and 235 V. The upper limit value VHtp and the lower limit value VLtp of the total voltage Vt per unit cell are respectively 0.817V and 0.783 V. As described above, the lower limit value VLtp per unit cell of the lower limit value VLt of the total voltage Vt is 0.783 V, which is higher than each of the lower limit value VL1p and the lower limit value VL2p. This ensures the output responsiveness of the FCs 4-1, 4-2, and 4-3 at the time of restarting power generation. Further, the timing when the total voltage Vt reaches the lower limit value VLt is deviated from the timing when the voltage V1 reaches the lower limit value VL1 and the timing when the voltage V2 reaches the lower limit value VL2.

In the sixth embodiment, the ECU 3 executes the control illustrated in FIG. 4, executes the control illustrated in FIG. 5 for the voltage V1, and executes the control illustrated in FIG. 6 for the total voltage Vt in replacing the flow rate Q2 with the flow rate Q3 of the cathode gas to be supplied to the FC 4-3. Regarding the voltage V2, the flow rate Q2 is switched to the large flow rate QH when the voltage V2 reaches an initial lower limit value higher than the lower limit value VL2 during the first decrease of the voltage V1, and the flow rate Q2 is switched to the large flow rate QH when the voltage V2 reaches the lower limit value VL2 after the first decrease of the voltage V1, in order not to match the timing when the voltage V1 reaches the lower limit value VL1 and the timing when the voltage V2 reaches the lower limit value VL2. Such control allows the voltage V1, the voltage V2, and the total voltage Vt to suitably increase and decrease to be maintained within predetermined ranges.

Further, in the sixth embodiment, the ECU 3 may execute the control illustrated in FIG. 9 for the voltage V1, and may execute the control illustrated in FIG. 10 for the total voltage Vt in replacing the flow rate Q2 with the flow rate Q3 to be supplied to the FC 4-3. As for the voltage V2, by using an initial lower limit value different from the initial lower limit value $VL\alpha 1$ for the voltage V1 illustrated in FIG. 9, the timing when the voltage V1, the voltage V2, and the total voltage Vt reach respective lower limit value may be deviated from one another.

In the sixth embodiment, as for the total voltage Vt, the ECU 3 may switch the flow rate corresponding to the total voltage Vt to the large flow rate QH such that the total voltage Vt increases, when the total voltage Vt is equal to or lower than the lower limit value VLt, and when the voltages V1 and V2 or at least one of the voltages V1 and V2 is relatively high within the corresponding range.

In the sixth embodiment, the ECU 3 may execute the control illustrated in FIGS. 13 and 14. For example, it is assumed that the voltage V1, the voltage V2, and the total voltage Vt are adjusted to reach the respective corresponding lower limit values in this order in an initial state after the changeover switch 36 switches the state to the disconnected state. T indicates a time interval between the timing when the voltage V1 reaches the lower limit value VL1, and the subsequent timing when the voltage V1 reaches the lower limit value VL1. U1 indicates a time interval between the timing when the voltage V1 reaches the lower limit value VL1, and the timing when the voltage V2 reaches the lower limit value VL2 adjacent to and after the timing when the voltage V1 reaches the lower limit value VL1. U2 indicates a time interval between the timing when the voltage V2 reaches the lower limit value VL2, and the timing when the total voltage Vt reaches the lower limit value VU adjacent to and after the timing when the voltage V2 reaches the lower limit value VL2. U3 indicates a time interval between the timing when the total voltage Vt reaches the lower limit value VLt. and the timing when the voltage V1 reaches the lower limit value VL1 adjacent to and after the timing when the total voltage Vt reaches the lower limit value VLt. In this case, the ideal timing is $(U1/T)=(U2/T)=(U3/T)=\frac{1}{3}$. In a case where a permissible timing deviation amount is ($\frac{1}{6}$), the permissible timing range is ($\frac{1}{6}$)≤(U1/T)≤($\frac{3}{6}$), ($\frac{1}{6}$)≤(U2/T)≤($\frac{3}{6}$), and ($\frac{1}{6}$)≤(U3/T)≤($\frac{3}{6}$).

In a case where ($\frac{1}{6}$)>(U1/T) is satisfied, the ECU 3 controls the voltage V1 to increase, when the voltage V1 is decreasing before reaching the lower limit value VL1. In a case where (U1/T)>($\frac{3}{6}$) is satisfied, the ECU 3 controls the voltage V2 to increase, when the voltage V2 is decreasing before reaching the lower limit value VL2. In these cases, as for the time intervals T and U1, the timing when the voltage V1 reaches the lower limit value VL1 is an example of the first timing and also an example of the second timing, and the timing when the voltage V2 reaches the lower limit value VL2, adjacent to and after the timing when the voltage V1 reaches the lower limit value VL1, is an example of the third timing. Further, in a case where ($\frac{1}{6}$)>(U2/T) is satisfied, the ECU 3 controls the voltage V2 to increase, when the voltage V2 is decreasing before reaching the lower limit value VL2. In a case where (U2/T)>($\frac{3}{6}$) is satisfied, the ECU 3 controls the total voltage Vt to increase, when the total voltage Vt is decreasing before reaching the lower limit value VLt. It is thus possible to bring the timing when the voltage V1, the voltage V2, and the total voltage Vt respectively reach the lower limit values corresponding thereto in this order into being closer to the ideal timing. In this case, as for the time intervals T and U2, the timing when the voltage V1 reaches the lower limit value VL1 is an example of the first timing, the timing when the voltage V2 reaches the lower limit value VL2 is an example of the second timing, and the timing when the total voltage Vt reaches the lower limit value VLt, adjacent to and after the timing when the voltage V2 reaches the lower limit value VL2, is an example of the third timing.

If the timing approaches the ideal timing as for the time intervals U1 and U2 as described above, the timing inevitably approaches the ideal timing as for the time interval U3. However, the ECU 3 may execute control as follows. In a case where ($\frac{1}{6}$)>(U3/T) is satisfied, the ECU 3 may control the total voltage Vt to increase, when the total voltage Vt is decreasing before reaching the lower limit VLt. In a case where (U3/T)>($\frac{3}{6}$) is satisfied, the ECU 3 may control the voltage V1 to increase, when the voltage V1 is decreasing before reaching the lower limit value VL1. In these cases, as for the time intervals T and U3, the timing when the voltage V1 reaches the lower limit value VL1 is an example of the first timing, the timing when the total voltage Vt reaches the lower limit value VLt is an example of the second timing, and the timing when the voltage V1 reaches the lower limit value VL1, adjacent to and after the total voltage Vt reaches the lower limit value VLt1, is an example of the third timing.

In the sixth embodiment, the ECU 3 that integrally controls the cathode gas supply systems 10-1, 10-2, and 10-3 has been described as an example, but the present disclosure is not limited to this. For example, there may be separately provided with an ECU that controls the cathode gas supply system 101, an ECU that controls the cathode gas supply system 10-2, and an ECU that controls the cathode gas supply system 10-3. Further, the number of stacked unit cells of the FC 4-3 has only to be equal to or greater than the number of stacked unit cells of each of the FCs 4-1 and 4-2. Further, the FCs 4-1 and 4-2 may differ in the number of stacked unit cells. In either case, the lower limit value VLtp that is the lower limit value VLt of the total voltage Vt per unit cell has to be higher than each of the lower limit value VL1$p$ of the voltage V1 per unit cell and the lower limit value VL2$p$ of the voltage V2 per unit cell. The total voltage Vt is detected by, but not limited to, the voltage sensor St. Instead of the voltage sensor St, a voltage sensor for detecting the voltage of only the FC 4-3 may be provided, and the total value of the detection value of this voltage sensor and the voltage sensors S1 and S2 may be used as the total voltage Vt.

Seventh Embodiment

Figure 19:
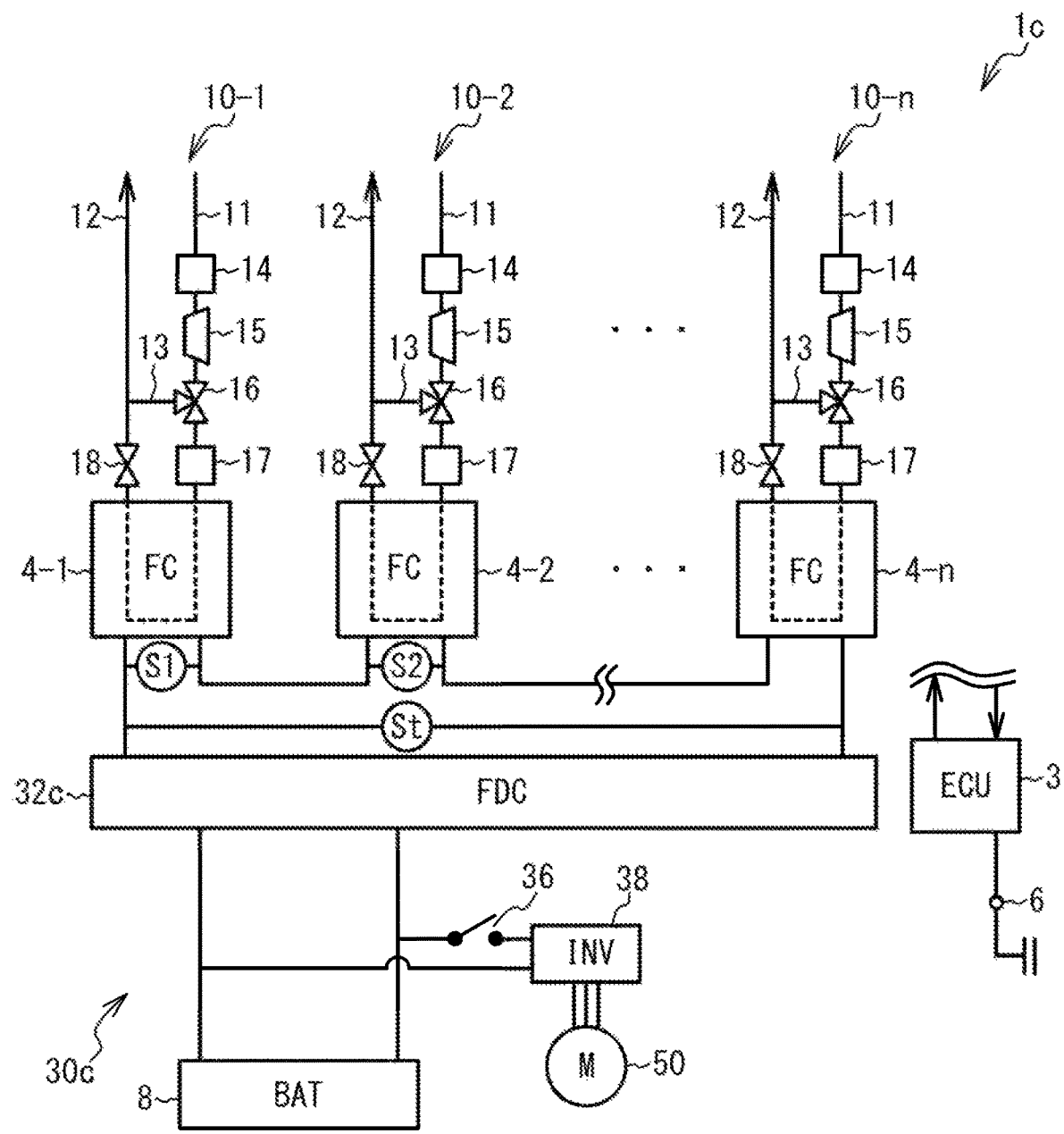
FIG. 19 is a schematic configuration view of a fuel cell system according to a seventh embodiment.

FIG. 19 is a schematic configuration view of a fuel cell system 1$c$ according to a seventh embodiment. The fuel cell system 1$c$ includes FCs 4-1, 4-2, . . . and 4-$n$, that is, the fuel cell system 1$c$ includes n fuel cells. The FCs 4-1 to 4-$n$ are examples of a fuel cell unit. Likewise, the fuel cell system 1$c$ includes cathode gas supply systems 10-1, 10-2, . . . , and 10-$n$, that is, the fuel cell system 1$c$ includes n cathode gas supply systems. Voltage sensors S1, 2, . . . and S(n−1) respectively detect the voltage V1 of the FC 4-1, the voltage V2 of the FC 4-2, . . . and the voltage V(n−1) of the FC 4-(n−1). In the seventh embodiment, n≥4 is satisfied. In FIG.

19, the FCs 4-3 to 4-(n−1), the cathode gas supply system 10-3 to 10-(n−1), and the voltage sensors S3 to S(n−1) are not illustrated.

The FCs 4-1 to 4-n are the same as one another in used unit cell and in the number of stacked unit cells, and the specific number of stacked unit cells is 100. The voltage sensor St detects the total voltage Vt of the FCs 4-1 to 4-n. An FDC 32c of a power control system 30c adjusts the DC power from the FCs 4-1 to 4-n and outputs it to the INV 38.

The cathode gas supply systems 10-1 to 10-n control the flow rates Q1 to Qn of the cathode gas to be supplied to the FCs 4-1 to 4-n, respectively. Specifically, in the open circuit voltage control, each of the flow rates Q1 to Qn is controlled to the small flow rate QL or the large flow rate QH. Therefore, in the open circuit voltage control, the decreasing speed of the voltages V1 to V(n−1) and the total voltage Vt is substantially the same, and the increasing speed is also substantially the same.

The voltage of the lower limit value VLt of the total voltage Vt per unit cell in the open circuit voltage control is higher than the voltage of any one of the lower limit value of the voltages V1 to V(n−1) per unit cell. Specifically, the lower limit value of the total voltage Vt per unit cell of the FC 4-n is higher than the respective lower limit values per unit cell of the FCs 4-1 to 4-(n−1). This ensures the output responsiveness of the FCs 4-1 to 4-n when the power generation restarts. This also causes the timing when the total voltage Vt reaches the lower limit value VLt to deviate from the timing when the other voltage reaches the lower limit value.

In the seventh embodiment, the ECU 3 executes the control illustrated in FIG. 4, executes the control illustrated in FIG. 5 for the voltage V1, and executes the control illustrated in FIG. 6 for the total voltage Vt in replacing the flow rate Q2 with the flow rate Qn of the cathode gas to be supplied to the FC 4-n. Regarding the voltages V2 to V(n−1), in order not to mutually match the timing when the voltages V1 to V(n−1) reach the corresponding lower limit values, each of the voltages V2 to V(n−1) may be controlled to increase during the first decrease before reaching the corresponding lower limit value and to increase when reaching the corresponding lower limit value after the first decrease, or may be controlled to decrease during the first increase before reaching the upper limit value and to decrease when reaching the corresponding upper limit value after the first increase. Such control permits the voltage V1 to V(n−1) and the total voltage Vt to suitably increase and decrease so as to be maintained within a predetermined range.

Further, in the seventh embodiment, the ECU 3 executes the control illustrated in FIG. 9 for the voltage V1, and executes the control illustrated in FIG. 10 for the total voltage Vt in replacing the flow rate Q2 with the flow rate Qn of the cathode gas to be supplied to the FC 4-n. Regarding the voltages V2 to V(n−1), in order not to mutually match the timing when the voltages V1 to V(n−1) reach the corresponding lower limit values, each of the voltages V2 to V(n−1) is controlled to increase during the first decrease before reaching the corresponding lower limit value and to increase when reaching the corresponding lower limit value after the first decrease. By controlling in this way, the voltage V1 to V(n−1) and the total voltage Vt suitably increase and decrease so as to be maintained within a predetermined range.

In the seventh embodiment, like the control illustrate in FIG. 11, the ECU 3 may switch the flow rate corresponding to the total voltage Vt to the large flow rate QH such that the total voltage Vt increases, when the total voltage Vt is equal to or lower than the corresponding lower limit value, and when each of the voltages V1 to V(n−1) is higher than a value obtained by adding the corresponding lower limit value with a predetermined margin. Additionally, the value obtained by adding the corresponding lower limit value with a predetermined margin is smaller than a middle value between the predetermined upper limit value and the predetermined lower limit value, and is, for example, a value obtained by adding the lower limit value with a margin that is about one-tenth of a difference between the upper limit value and the lower limit value. This margin may be set to a value made smaller as the number of fuel cells included in the fuel cell system increases.

In the seventh embodiment, the ECU 3 may execute the controls illustrated in FIGS. 13 and 14. For example, assuming that each of the voltage V1, V2, . . . V(n−1) and the total voltage Vt is adjusted to reach the corresponding lower limit value in this order in the initial stage after the changeover switch 36 switches the state to the disconnected state, T indicates the time interval between the timing when the voltage V1 reaches the lower limit value VL1, and the subsequent timing when the voltage V1 reaches the lower limit value VL1, and U1 indicates a time interval between the timing when the voltage V1 reaches the lower limit value VL1, and the timing when the voltage V2 reaches the lower limit value VL2 adjacent to and after the timing when the voltage V1 reaches the lower limit value VL1. U2 indicates a time interval between the timing when the voltage V2 reaches the lower limit value VL2, and the timing when the voltage V3 reaches the lower limit value VL3 adjacent to and after the timing when the voltage V2 reaches the lower limit value VL2. Likewise, U(n−1) indicates a time interval between the timing when V(n−1) reaches the corresponding lower limit value, and the timing when the total voltage Vt reaches the lower limit value VLt adjacent to and after the timing when V(n−1) reaches the corresponding lower limit value. In this case, the ideal timing is achieved when $(U1/T)=(U2/T)=\ldots(U(n-1)/T)=1/n$ is satisfied. Assuming that the permissible amount of timing deviation is (½n), the permissible range of timing is $(½n) \leq (U1/T) \leq (3/2n)$. The same applies to each permissible range of the other time intervals U2 to U(n−1).

In a case where $(½n)>(U1/T)$ is satisfied, the ECU 3 controls the voltage V1 to increase, when the voltage V1 is decreasing before reaching the lower limit value VL1. In a case where $(U1/T)>(3/2n)$ is satisfied, the ECU 3 controls the voltage V2 to increase, when the voltage V2 is decreasing before reaching the lower limit value VL2. Further, in a case where $(½n)>(U(n-1)/T)$ is satisfied, the ECU 3 controls the voltage V(n−1) to increase, when the voltage V(n−1) is decreasing before reaching the corresponding lower limit value. In a case where $(U(n-1)/T)>(3/2n)$ is satisfied, the ECU 3 controls the total voltage Vt to increase, when the total voltage Vt is decreasing before reaching the lower limit value VLt. It is thus possible to bring the timing when the voltages V1, V2 . . . and the total voltage Vt reach the respective lower limit values corresponding thereto in this order into being closer to the ideal timing.

In the seventh embodiment, the ECU 3 that integrally controls the cathode gas supply systems 10-1 to 10-n has been described as an example, but the present disclosure is not limited to this. For example, ECUs that individually control the cathode gas supply systems 10-1 to 10-n may be provided. Further, the number of stacked unit cells of the FC 4-n has only to be equal to or greater than each number of stacked unit cells of the FCs 4-1 to 4-(n−1). Further, the FCs 4-1 to 4-(n−1) may differ in the number of stacked unit cells. The total voltage Vt is detected by, but not limited to, the voltage sensor St. Instead of the voltage sensor St, a voltage sensor that detects only the voltage of the FC 4-n may be provided, and the total value of the detection values detected by the voltage sensor and the voltage sensors S1 to S(n−1) may be used as the total voltage Vt.

The above-mentioned fuel cell systems are installed in, but not limited to, vehicles such as private cars, buses, and refrigerator cars. For example, it may be a stationary fuel cell system. Further, the vehicle may be not only an automobile but also a two-wheeled vehicle, a railroad vehicle, a ship, an aircraft, or the like. Further, the vehicle may be a hybrid vehicle in which a motor and an internal combustion engine can be used in combination for driving.

Although some embodiments of the present disclosure have been described in detail, the present disclosure is not limited to the specific embodiments but may be varied or changed within the scope of the present disclosure as claimed.

The invention claimed is:

1. A fuel cell system comprising:
a fuel cell unit including first to nth (n is an integer equal to or greater than two) fuel cells connected in series to each other to supply electric power to a load device, the first to nth fuel cells each including same unit cells that are stacked;
first to nth supply systems that independently supply cathode gas to the first to nth fuel cells, respectively;
a switching device capable of switching a state between a connected state where the fuel cell unit and the load device are electrically connected to each other and a disconnected state where the fuel cell unit and the load device are electrically disconnected from each other; and
a control unit, when required output to the fuel cell unit is equal to or smaller than a threshold value, configured to control the switching device to switch the state from the connected state to the disconnected state, and to control the first to nth supply systems to respectively control the first to nth fuel cells so as to respectively control flow rates of the cathode gas to be supplied to the first to nth fuel cells,
wherein
the number of stacked unit cells of the nth fuel cell is equal to or greater than the number of stacked unit cells of each of the first to (n−1)th fuel cells,
the control unit is configured to include:
an obtainer configured to obtain, in the disconnected state, first to (n−1)th open circuit voltages of respective open circuit voltages of the first to (n−1)th fuel cells, and a total open circuit voltage of the fuel cell unit; and
a controller configured to respectively control the flow rates of the cathode gas to be supplied to the first to (n−1)th fuel cells to first to (n−1)th large flow rates so as to respectively increase the first to (n−1)th open circuit voltages, when the first to (n−1)th open circuit voltages are respectively equal to or lower than first to (n−1)th lower limit values, and configured to respectively control the flow rates of the cathode gas to be supplied to the first to (n−1)th fuel cells to first to (n−1)th small flow rates respectively smaller than first to (n−1)th large flow rates so as to respectively decrease the first to (n−1)th open circuit voltages, when the first to (n−1)th open circuit voltages are respectively equal to or higher than first to (n−1)th upper limit values,
the controller is configured to control the flow rate of the cathode gas to be supplied to the nth fuel cells to a nth large flow rate so as to increase the total open circuit voltage, when the total open circuit voltage is equal to or lower than a nth lower limit value, and is configured to control the flow rate of the cathode gas to be supplied to the nth fuel cell to a nth small flow rate so as to decrease the total open circuit voltage, when the total open circuit voltage is equal to or higher than a nth upper limit value,
a value obtained by dividing the nth lower limit value by the total number of stacked unit cells of the fuel cell unit is greater than each of values obtained by respectively dividing the first to (n−1)th lower limit values by the number of the stacked unit cells of the first to (n−1)th fuel cells.

2. The fuel cell system according to claim 1, wherein the controller is configured to switch the flow rate of the cathode gas to be supplied to the nth fuel cell to the nth small flow rate, when the total open circuit voltage is increasing for the first time since the switching device switches the state from the connected state to the disconnected state and before the total open circuit voltage reaches the nth upper limit value.

3. The fuel cell system according to claim 1, wherein the controller is configured to switch the flow rate of the cathode gas to be supplied to one of the first to (n−1)th fuel cells to a corresponding large flow rate, when the open circuit voltage of the one of the first to (n−1)th fuel cells is decreasing for the first time since the switching device switches the state from the connected state to the disconnected state and before the open circuit voltage of the one of the first to (n−1)th fuel cells reaches a corresponding lower limit value.

4. The fuel cell system according to claim 1, wherein the controller is configured to switch the flow rate of the cathode gas to be supplied to the nth fuel cell to the nth large flow rate, when the total open circuit voltage is equal to or lower than the nth lower limit value, and when at least one of the first to (n−1)th open circuit voltages is equal to or higher than a predetermined value between a corresponding upper limit value and a corresponding lower limit value.

5. The fuel cell system according to claim 1, wherein
first timing is timing when any one of the first to (n−1)th open circuit voltages reaches a corresponding lower limit value,
second timing is timing when one of two of the open circuit voltages, among the first to (n−1)th open circuit voltages and the total open circuit voltage, reaches a corresponding lower limit value,
third timing is timing when the other of the two of the open circuit voltages reaches a corresponding lower limit value,
T is a time interval between the first timing,
U is a time interval between the second timing and the third timing adjacent to and after the second timing,
in a case where $(1/2n)>(U/T)$ is satisfied, the controller is configured to switch the flow rate of the cathode gas to be supplied to the fuel cell corresponding the one of the two of the open circuit voltages to a corresponding large flow rate, when the one of the two of the open circuit voltages is decreasing before the one of the two of the open circuit voltages reaches a corresponding lower limit value,
in a case where $(U/T)>(3/2n)$ is satisfied, the controller is configured to switch the flow rate of the cathode gas to be supplied to the fuel cell corresponding the other of the two of the open circuit voltages to a corresponding large flow rate, when the other of the two of the open circuit voltages is decreasing before the other of the two of the open circuit voltages reaches a corresponding lower limit value.

6. The fuel cell system according to claim 1, wherein values obtained by respectively dividing the first to nth small flow rates by the number of stacked unit cells of the first to nth fuel cells are equal to each other.

7. The fuel cell system according to claim 1, wherein n=2 is satisfied.

8. The fuel cell system according to claim 1, wherein n=3 is satisfied.

* * * * *